US010322484B2

(12) United States Patent
Geissler et al.

(10) Patent No.: US 10,322,484 B2
(45) Date of Patent: Jun. 18, 2019

(54) MACHINE TOOL, IN PARTICULAR MULTI-SPINDLE MILLING MACHINE

(71) Applicant: DECKEL MAHO Pfronten GmbH, Pfronten (DE)

(72) Inventors: Alfred Geissler, Pfronten (DE); Robert Jung, Pfronten (DE); Martin Rinderle, Buchenberg (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 195 days.

(21) Appl. No.: 15/413,790

(22) Filed: Jan. 24, 2017

(65) Prior Publication Data

US 2017/0209975 A1    Jul. 27, 2017

(30) Foreign Application Priority Data

Jan. 25, 2016    (DE) .................. 10 2016 201 016

(51) Int. Cl.
*B23Q 7/04*    (2006.01)
*B23Q 3/157*   (2006.01)
(Continued)

(52) U.S. Cl.
CPC ....... *B23Q 39/042* (2013.01); *B23Q 3/15706* (2013.01); *B23Q 3/15724* (2016.11);
(Continued)

(58) Field of Classification Search
CPC .... B23Q 7/047; B23Q 7/1494; B23Q 1/4857; B23Q 39/24; Y10T 82/2511; Y10T 82/2524
See application file for complete search history.

(56) References Cited

U.S. PATENT DOCUMENTS 5,081,889 A * 1/1992 Takano ............... B23B 5/02
                                                  82/122
5,781,983 A * 7/1998 Gruner ............. B23Q 7/047
                                                  29/33 P
(Continued)

FOREIGN PATENT DOCUMENTS

DE    102 24 347 A1    12/2003
DE    102 35 518 A1     3/2004
(Continued)

OTHER PUBLICATIONS

Extended European Search Report, dated Jun. 19, 2017, for European Application No. 17152402.8-1702, 10 pages (with Partial English Translation).
(Continued)

*Primary Examiner* — Willmon Fridie, Jr.
(74) *Attorney, Agent, or Firm* — Seed Intellectual Property Law Group LLP

(57) ABSTRACT

A machine tool, in particular a multi-spindle and/or double-spindle milling machine, comprising a machine frame, a workpiece clamping device for clamping a workpiece, an axis slide assembly which is arranged on the machine frame and is configured to linearly move the workpiece clamped on the workpiece clamping device by way of two controllable linear axes in a Y-direction and a Z-direction, and a spindle carrier assembly, which is arranged on the machine frame and has at least two tool-carrying work spindles that can be moved independently of each other in an X-direction which is perpendicular to the Y-direction and Z-direction.

21 Claims, 19 Drawing Sheets

(51) Int. Cl.
  *B23Q 39/02* (2006.01)
  *B23Q 39/04* (2006.01)
  *B23Q 39/00* (2006.01)

(52) U.S. Cl.
  CPC ......... *B23Q 3/15733* (2013.01); *B23Q 7/047* (2013.01); *B23Q 39/024* (2013.01); *B23Q 2039/002* (2013.01)

(56) References Cited

U.S. PATENT DOCUMENTS

| | | | | |
|---|---|---|---|---|
| 8,136,214 | B2* | 3/2012 | Hessbruggen | B23B 3/06 |
| | | | | 29/27 C |
| 8,661,950 | B2* | 3/2014 | Hessbrueggen | B23Q 7/047 |
| | | | | 82/1.11 |
| 2003/0221308 | A1 | 12/2003 | Hessbruggen | |
| 2004/0060402 | A1* | 4/2004 | Shimada | B23B 13/126 |
| | | | | 82/124 |
| 2004/0102297 | A1* | 5/2004 | Quak | B23Q 1/4857 |
| | | | | 483/56 |
| 2004/0110614 | A1* | 6/2004 | Hessbruggen | B23Q 1/012 |
| | | | | 483/18 |
| 2005/0061120 | A1* | 3/2005 | Hammer | B23B 3/06 |
| | | | | 82/122 |
| 2006/0048614 | A1* | 3/2006 | Lange | B23B 3/167 |
| | | | | 82/129 |
| 2016/0167187 | A1 | 6/2016 | Burkhardt et al. | |

FOREIGN PATENT DOCUMENTS

| | | |
|---|---|---|
| DE | 10 2010 064 271 A1 | 6/2012 |
| DE | 10 2011 010 666 A1 | 8/2012 |
| DE | 20 2013 000 225 U1 | 5/2014 |
| DE | 10 2013 013 050 A1 | 1/2015 |
| EP | 2 233 247 A1 | 9/2010 |
| JP | 63-89235 A | 4/1988 |
| WO | 02/00390 A1 | 1/2002 |
| WO | 02/32619 A1 | 4/2002 |

OTHER PUBLICATIONS

Office Action dated Feb. 14, 2017 in German Application No. 10 2016 201 016.6, with partial English Translation, 11 pages.

* cited by examiner

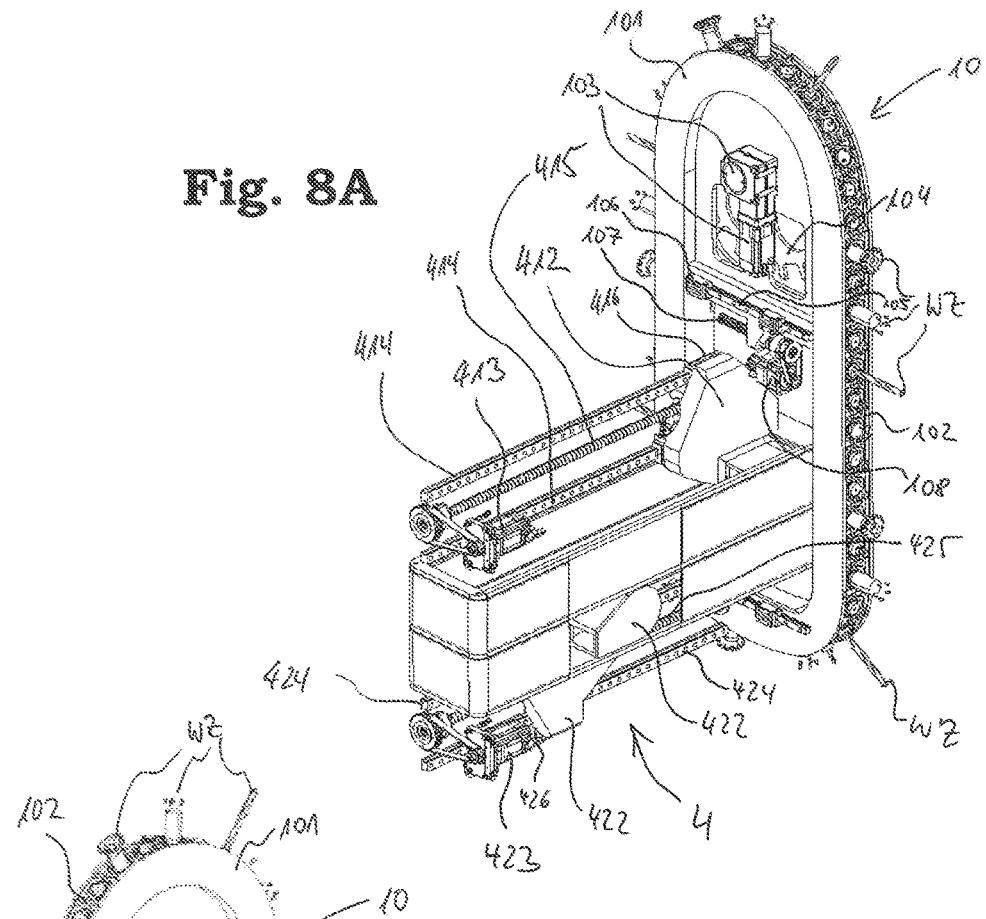
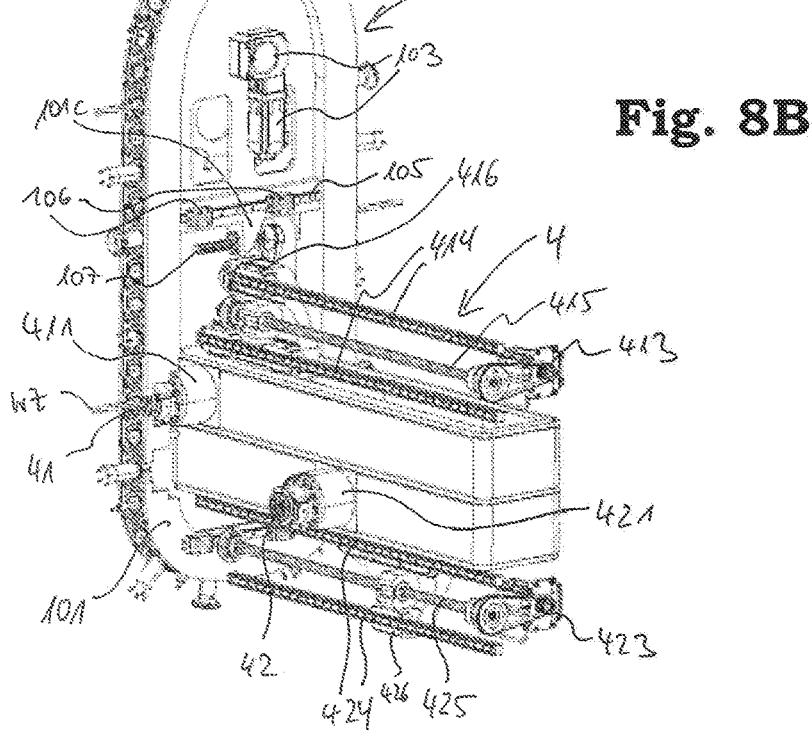

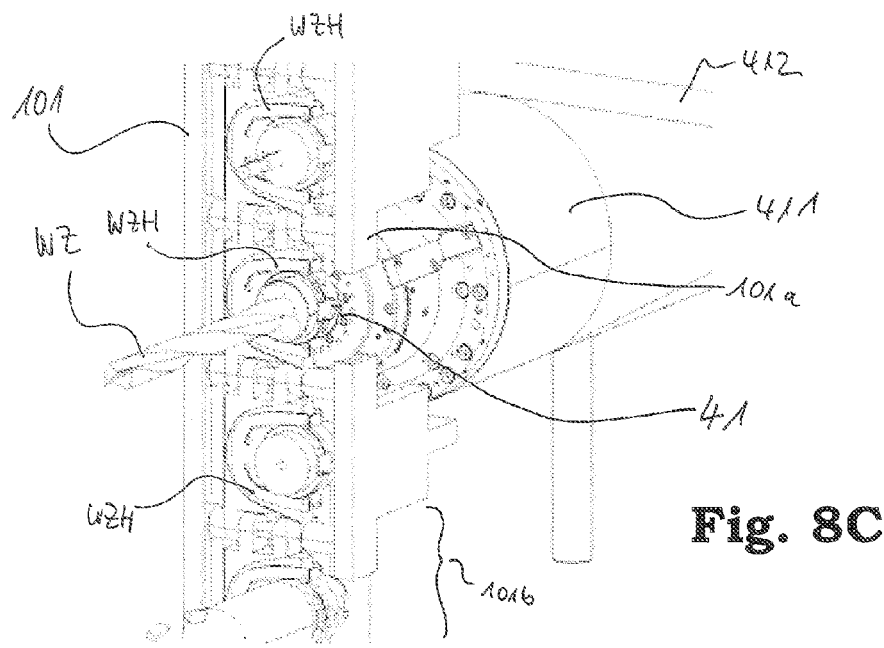
Fig. 8C
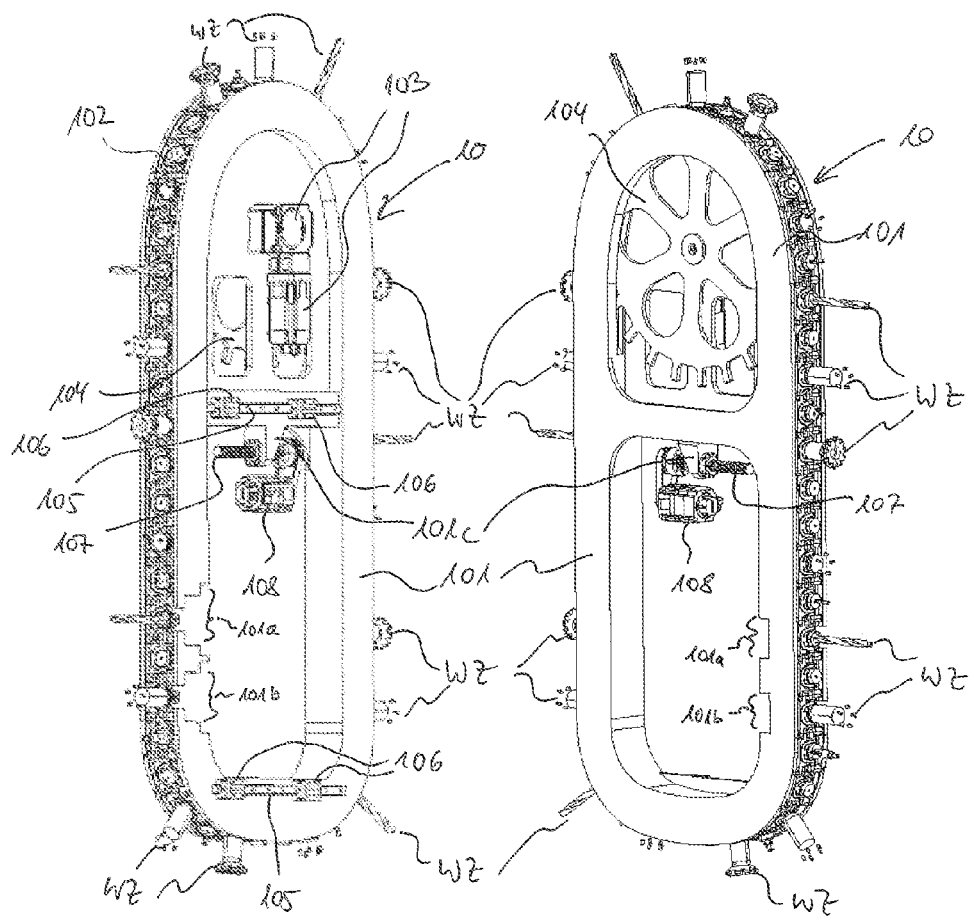
Fig. 9A  Fig. 9B

MACHINE TOOL, IN PARTICULAR MULTI-SPINDLE MILLING MACHINE

BACKGROUND

Technical Field

The present disclosure relates to a machine tool, in particular a numerically controllable machine tool or milling machine. In particular, the present disclosure relates to a multi-spindle milling machine, multi-spindle drilling machine and/or multi-spindle milling/drilling machine or a multi-spindle universal milling machine and/or a multi-spindle machining center, in particular having two or more tool-carrying work spindles.

Description of the Related Art

The prior art discloses machine tools having a tool-carrying work spindle. They are nowadays usually equipped with numeric controls and known, e.g., as milling machines, milling centers, universal milling machines or CNC machining centers having four, five or sometimes also more than five numerically controllable linear axes and/or rotary axes or swivel axes; see in this connection, e.g., the machine tool according to DE 10 2010 064 271 A1.

Such machine tools having a tool-carrying work spindle have to be distinguished from machine tools having a workpiece-carrying work spindle, such as lathes, turning centers, double-spindle lathes, multi-spindle lathes or multi-spindle automatic lathes.

BRIEF SUMMARY

A basic object in the field of machine tool engineering and in particular an underlying object of the present disclosure is to provide a machine tool having a tool-carrying work spindle, in particular a machine tool for milling and/or drilling a workpiece, wherein said machine tool operates simultaneously with high precision and reliably with the least possible down times and can also be provided in a cost-effective, compact and efficient way.

The present disclosure proposes a machine tool, in particular according to claim 1 and/or the alternative independent claims. The dependent claims relate to preferred embodiments of the disclosure.

According to an aspect of the present disclosure, a machine tool is proposed, comprising a machine frame, a workpiece clamping device for clamping a workpiece, an axis slide assembly which is arranged on the machine frame and is configured to linearly move the workpiece clamped on the workpiece clamping device by way of at least two controllable linear axes, and/or a spindle carrier assembly which is arranged on the machine frame and has at least two tool-carrying work spindles.

In preferred embodiments, a first work spindle of the at least two tool-carrying work spindles can be moved linearly between a first processing position of the first work spindle and a first tool change position of the first work spindle by way of a third controllable linear axis perpendicularly to the respective two controllable linear axes of the axis slid assembly.

In preferred embodiments, a second work spindle of the at least two tool-carrying work spindles is linearly movable between a second processing position of the second work spindle and a second tool change position of the second work spindle by way of a fourth controllable linear axis in parallel to the direction of the third controllable linear axis.

Aspects of the disclosure are based on the concept of being able to provide two tool-carrying work spindles which can process the same workpiece simultaneously and/or independently of one another, wherein in particular one tool change each is possible at one of the work spindles when it is positioned at the respective tool change position while, in time-saving manner, it is possible by way of a tool received at the other work spindle to process the workpiece clamped on the workpiece clamping device by way of the other work spindle. This advantageously reduces possible down times resulting from tool changes.

In addition, the machine tool can be extremely compact and made with a particularly small stand space of the machine frame (with possible tool magazine) because the movability to the respective tool change position is rendered possible by a respective linear axis which, when the workpiece is processed, additionally provides a further translational degree of freedom as regards the relative movement between tool and workpiece. The other two translational degrees of freedom as regards the relative movement between tool and workpiece can here be provided in an extremely compact design by the two (or more) linear axes of the axis slide assembly.

In preferred embodiments, the directions of the third and fourth linear axes can be aligned horizontally and the first tool change position can be arranged substantially above the second tool change position.

An advantage is that the same tool change mechanism and/or the same tool magazine can be used for tool changes on both work spindles, optionally without having to provide any further tool change manipulators. This renders possible in an advantageous way an even more compact design, as a result of which a space required for the machine tool can be reduced advantageously in workshops.

In preferred embodiments, the machine tool can also comprise a tool magazine that can have a tool magazine carrier which is arranged on the machine frame, can preferably be configured to have available a plurality of tools and can preferably be moved by way of a fifth linear axis perpendicularly to the directions of the third and fourth linear axes and in particular parallel to the spindle axes of the two tool-carrying work spindles.

In preferred embodiments, the tool change positions of the two tool-carrying work spindles are arranged at a first position of the tool magazine carrier at respective change sections of the tool magazine carrier, and the two tool-carrying work spindles are preferably configured at the first position of the tool magazine carrier by a respective movement to the respective tool change position to directly use, for a tool change, tools at a tool holder of the tool magazine at the respective change section of the tool magazine carrier.

An advantage is that the same tool change mechanism and/or the same tool magazine can be used for tool changes at the two work spindles and in particular without having to provide any further tool change manipulators (which are space-wasting and time-consuming as regards the tool change). This favorably renders possible an even more compact design, as a result of which a space required for the machine tool can be advantageously reduced in workshops, and also favorably reduces the tool change times.

In preferred embodiments, the tool magazine carrier is configured to move from the first position into a second position by way of the fifth linear axis in order to remove a tool received at one of the tool spindles at the respective tool change position. Therefore, the tool can be lifted (away from the spindle or towards the spindle) when the tool is changed by moving the tool magazine and/or the tool magazine carrier in a space-saving and time-saving way since in particular no further tool change devices, change grippers or other manipulators are required.

In preferred embodiments, the tool magazine carrier is configured to move from the second position into the first position by way of the fifth linear axis in order to insert a tool at one of the tool spindles at the respective tool change position.

In preferred embodiments, the tool magazine also has a tool magazine chain which is arranged on the tool magazine carrier in such a way that it can preferably be moved circumferentially.

In preferred embodiments, a respective work spindle positioned at the corresponding processing position is configured by way of a received tool to process the workpiece clamped on the workpiece clamping device while the respectively other work spindle is positioned at the respective tool change position for a tool change. This reduces in an extremely advantageous way possible down times resulting from tool changes.

In preferred embodiments, a respective work spindle positioned at the corresponding tool change position (e.g., after a tool change) is configured to be accelerated to processing spindle speeds while the respectively other work spindle processes the workpiece clamped on the workpiece clamping device by way of a received tool. This reduces in an extremely advantageous way possible down times resulting from tool changes and during the acceleration of the spindles to processing speeds after the tool change.

In preferred embodiments, the machine tool has a protective cover device which can be opened and closed automatically and, preferably in a closed state, separates a machine tool processing area including the workpiece clamping device from the tool change positions of the machine tool and, in an open state, renders possible the movement of the work spindles between the processing area and the respective tool change positions.

In preferred embodiments, the first work spindle is configured to receive tool interfaces of a first size and the second work spindle is preferably configured to receive tool interfaces of a second size differing from the first size. An advantage is that the workpiece can be processed in immediate succession (i.e., in particular without possible down times resulting from spindle modifications or spindle changes and/or the use of adapters at the work spindles) by tools of different sizes and/or differently large tool interfaces on the same machine tool.

In further embodiments, the first work spindle and the second work spindle can both be configured to receive tool interfaces of equal size.

In preferred embodiments, the first work spindle can be configured to receive tool interfaces of a first tool interface type, in particular of the hollow shaft cone type, of the Morse taper type or of the steep taper type, and the second work spindle can be configured to receive tool interfaces of a second tool interface type differing from the first tool interface type. An advantage is that the workpiece can be processed in immediate succession (i.e., in particular without possible down times resulting from spindle modifications or spindle changes and/or the use of adapters at the work spindles) by tools mounted on different tool interfaces at the same machine tool.

In further embodiments, the first work spindle and the second work spindle can both be configured to receive tool interfaces of an equal tool interface type, in particular of the hollow shaft cone type, of the Morse taper type or of the steep taper type.

In preferred embodiments, the machine frame forms a processing area and the axis slide assembly is preferably arranged above the processing area on the machine frame.

The workpiece clamping device is preferably held at the axis slide assembly and is preferably configured to clamp the workpiece or a workpiece pallet holding the workpiece in a suspended or laterally suspended fashion, in particular for the overhead processing of the workpiece clamped in suspended fashion or clamped in overhead fashion on the workpiece clamping device. This renders possible an optimum chip fall where the chips can fall directly below the workpiece into a possible chip collecting pan without soiling the workpiece or drives and/or other tool machine components.

In preferred embodiments, the machine tool also comprises a conveying device for conveying workpieces, in particular having a workpiece pallet aligned upwards or laterally, to a clamping position where they are received by the workpiece clamping device from above for the suspended or laterally suspended clamping of one of the workpieces on the workpiece clamping device and/or for conveying one of the workpieces, in particular with an upwardly or laterally aligned workpiece pallet, from an unclamping position after releasing the workpiece from the suspended or laterally suspended clamping by the workpiece clamping device.

In preferred embodiments, the axis slide assembly is also configured to rotatorily move the workpiece clamped on the workpiece clamping device by way of at least one controllable circular axis; the workpiece clamped on the workpiece clamping device by way of two controllable circular axes about respective rotational axes which are aligned in inclined fashion or perpendicularly to one another; or to rotatorily move the workpiece clamped on the workpiece clamping device by way of three controllable circular axes about respective rotational axes, at least one rotational axis of which is aligned in inclined fashion or perpendicularly to at least one of the other rotational axes.

In preferred embodiments, the axis slide assembly is also configured to linearly move the workpiece clamped on the workpiece clamping device by way of at least three controllable linear axes.

In preferred embodiments, the respective work spindle positioned at the processing position is configured by way of a received tool to process the workpiece clamped on the workpiece clamping device.

According to a further aspect, it is possible to provide a machine tool comprising a machine frame, a workpiece clamping device for the overhead clamping of a workpiece, an axis slide assembly which is arranged on the machine frame and is configured to vertically and linearly move the workpiece clamped in overhead fashion on the workpiece clamping device by way of a vertically movable, controllable first linear axis in a Y-direction and to horizontally and linearly move it by way of a horizontally movable controllable second linear axis in a Z-direction, and a spindle carrier assembly which is arranged on the machine frame and has at least two tool-carrying work spindles which are horizontally and linearly movable in parallel independently from one another in an X-direction aligned perpendicularly in the Z-direction. The machine tool according to this aspect can be combined with all the above described aspects and features of embodiments.

Further aspects and advantages thereof as well as advantages and more specific possible embodiments of the above described aspects and features are described in the following descriptions and explanations of the appending drawings, said descriptions and explanations being by no means restrictive.

BRIEF DESCRIPTION OF THE SEVERAL VIEWS OF THE DRAWINGS

FIGS. 8A and 8B show exemplary perspective views of the spindle assembly and of the tool magazine of the machine tool from FIG. 1;

FIG. 8C shows an exemplary perspective detailed view of a work spindle of the machine tool from FIG. 1 at the machine change position;

FIGS. 9A and 9B show exemplary perspective views of the tool magazine of the machine tool from FIG. 1.

DETAILED DESCRIPTION

Figure 1:
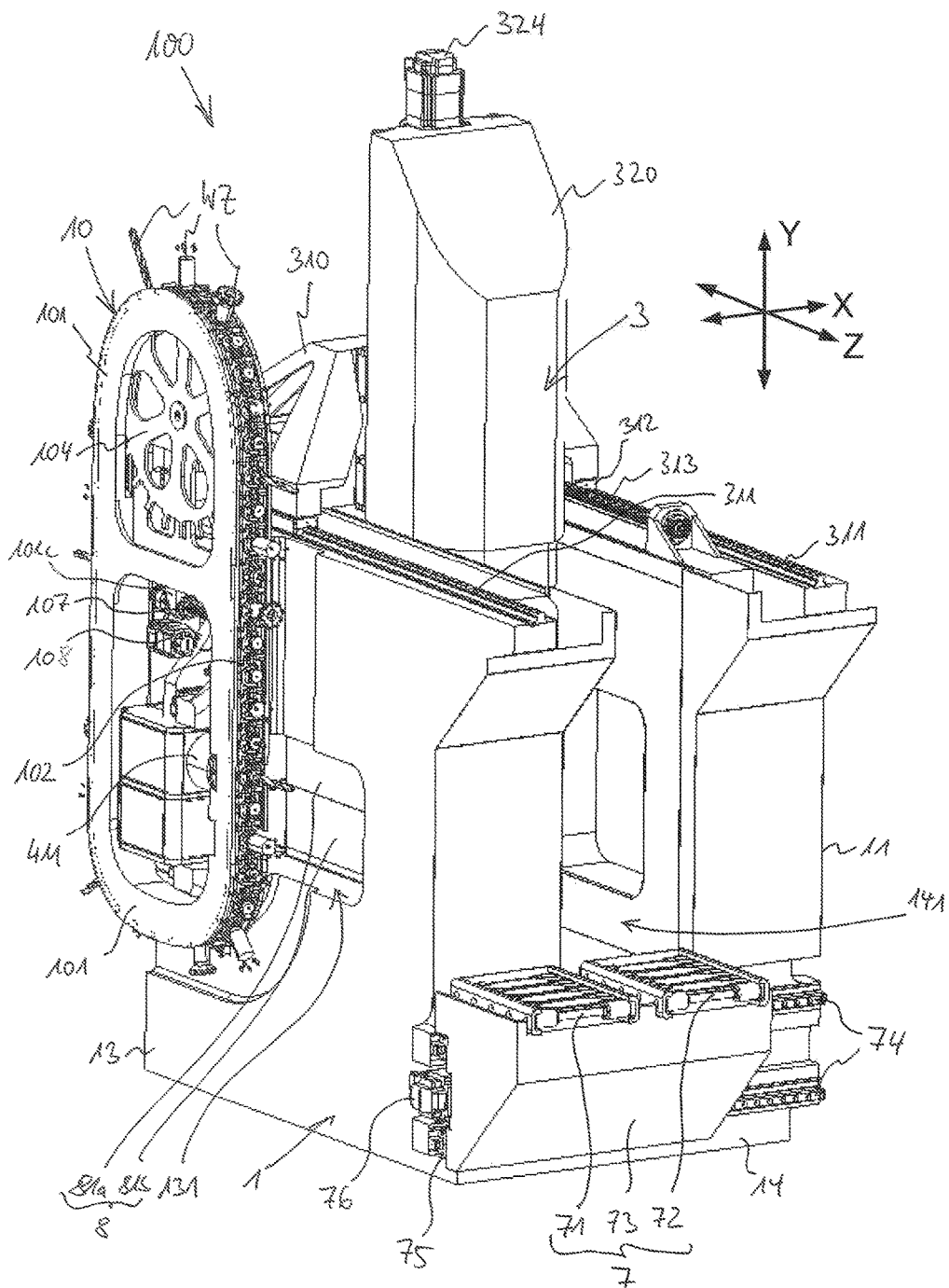
FIG. 1 shows an exemplary perspective view of a machine tool according to an embodiment of the disclosure.

Examples and embodiments of the present disclosure are described in detail below with reference to the enclosed drawings. Equal and similar elements in the drawings can here be designated by equal reference signs but sometimes also by different reference signs.

However, it is pointed out that the present disclosure is by no means limited or confined to the below described embodiments and design features thereof but comprises further embodiment modifications, in particular those included by modifications of the features of the described examples and/or by combination of individual or a plurality of the features of the described examples on the basis of the scope of the independent claims.

The attached illustrations relate to embodiments of the present disclosure and show exemplary illustrations of a machine tool. Only by way of example, this machine tool is a (double spindle) milling machine having two, e.g., parallel operating, tool-carrying work spindles and a numerically controllable machine kinematics with four controllable linear axes for relative translational movements between tool and workpiece, comprising a vertical Y-axis, a horizontal Z-axis and two parallel horizontal X-axes (e.g., referred to as X1-axis and X2-axis) and having two controllable, circular axes which, e.g., build on one another (e.g., a vertical C-axis and an inclined B-axis) where, e.g., two of the linear axes (Y- and Z-axes) and the two controllable circular axes can move the workpiece and the processing position of the operating work spindle is movable when the workpiece is processed by the respective X-axes.

For example, the machine tool 100 according to FIGS. 1 to 3D is made in particular as a numerically controllable (double spindle) milling machine having six drivable axes X1, X2, Y, Z, B and C, in particular with four linear axes, wherein three linear axes X1, Y and Z are aligned, e.g., orthogonally to one another and a further linear axis X2 or X2-axis is parallel to the X1-axis, and having two circular axes comprising an exemplary inclined swivel axis (B-axis) and a rotary axis (C-axis) building thereon and having a rotational axis that can be aligned, e.g., by pivoting the swivel axis in parallel to the Z-axis or in parallel to the Y-axis, depending on the swivel angle of the swivel axis (B-axis).

In further embodiments, it is possible to omit one or more of the provided linear and/or swivel or rotary axes or one or more additional linear and/or swivel or rotary axes, e.g., also one or more linear and/or swivel or rotary axes in order to further move the tool and/or the spindles.

It is here mentioned that a difference between a rotary axis and a swivel axis is that a rotary axis can be controlled rotatorily in both directions about its rotational axis, a rotation optionally about 360 degree or more or optionally about 720 degrees or more being possible, and that a swivel axis can be controlled rotatorily in both directions about its rotational axis between a first angular position and a second angular position, the angular positions being determined, optionally with an angular distance of 360 degrees or less, e.g., as 90 degrees, 120 degrees, 180 degrees, 270 degrees or 360 degrees. The term circular axis can optionally be used as a generic term for both rotary axes and swivel axes.

Furthermore, the machine tool 100 can comprise a numeric machine control (e.g., NC or CNC control, optionally with one or more NC and PLC control units) and/or a machine control panel (not shown) and can optionally have a machine tool housing and/or a control cabinet (not shown).

Furthermore, the machine tool 100 is made, by way of example, in such a way that the workpiece can be clamped in overhead fashion and renders possible an overhead processing of the workpiece where chips optimally fall downwards and can easily be caught or collected in a chip collecting pan.

Figure 2A:
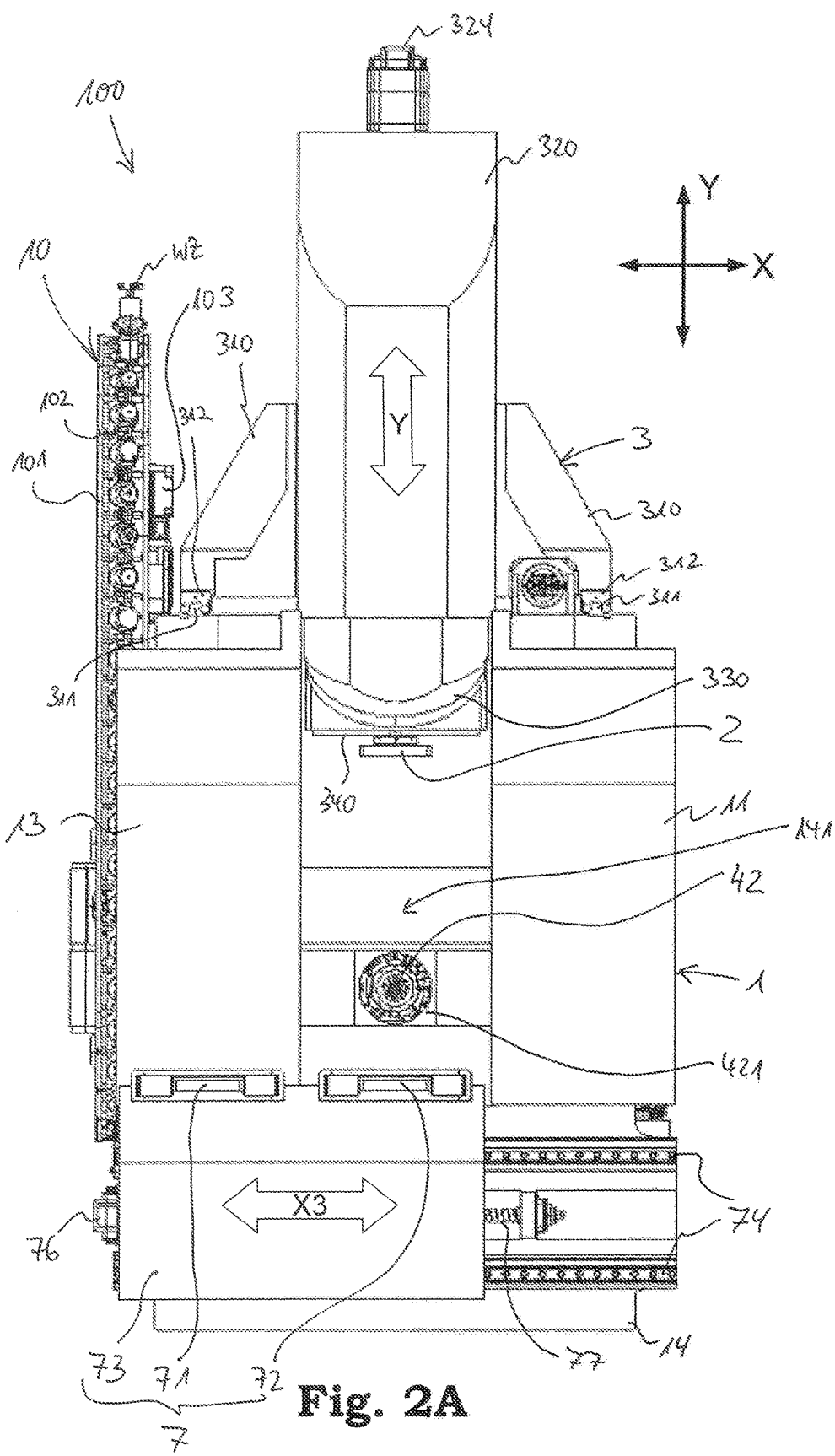
FIG. 2A shows a front view of the machine tool from FIG. 1.
Figure 2B:
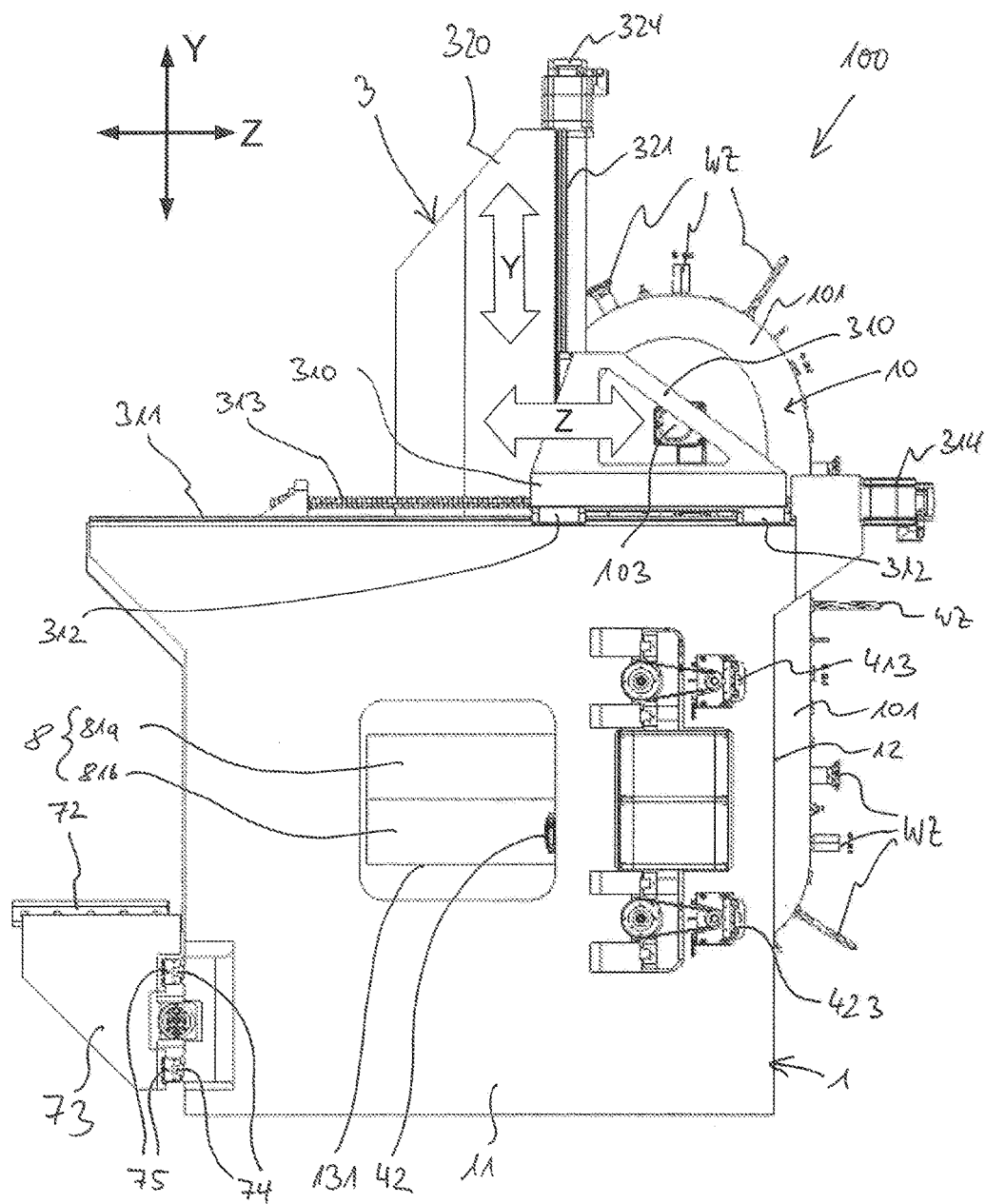
FIG. 2B shows, by way of example, a right-hand side view of the machine tool from FIG. 1.
Figure 2C:
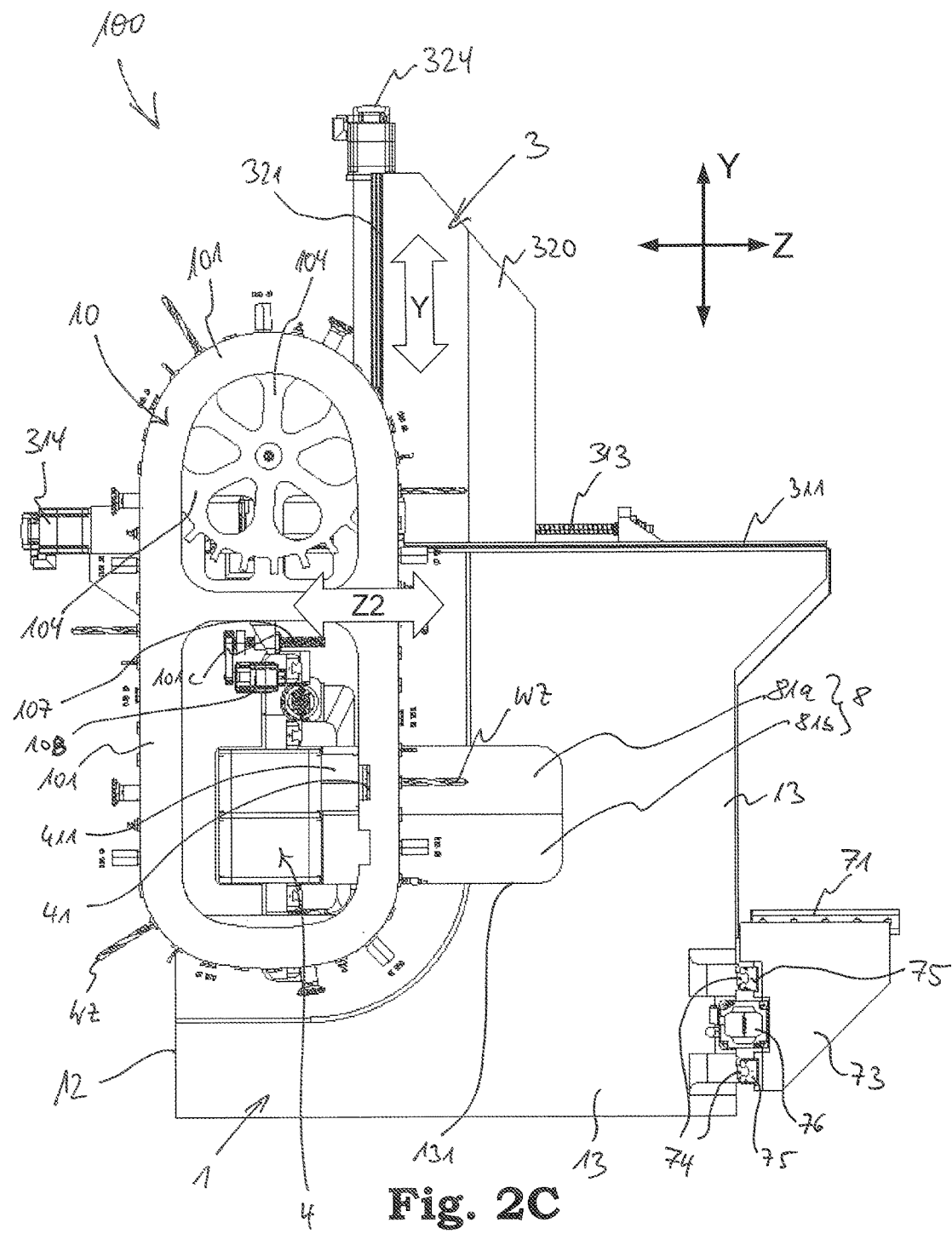
FIG. 2C shows an exemplary left-hand side view of the machine tool from FIG. 1.
Figure 2D:
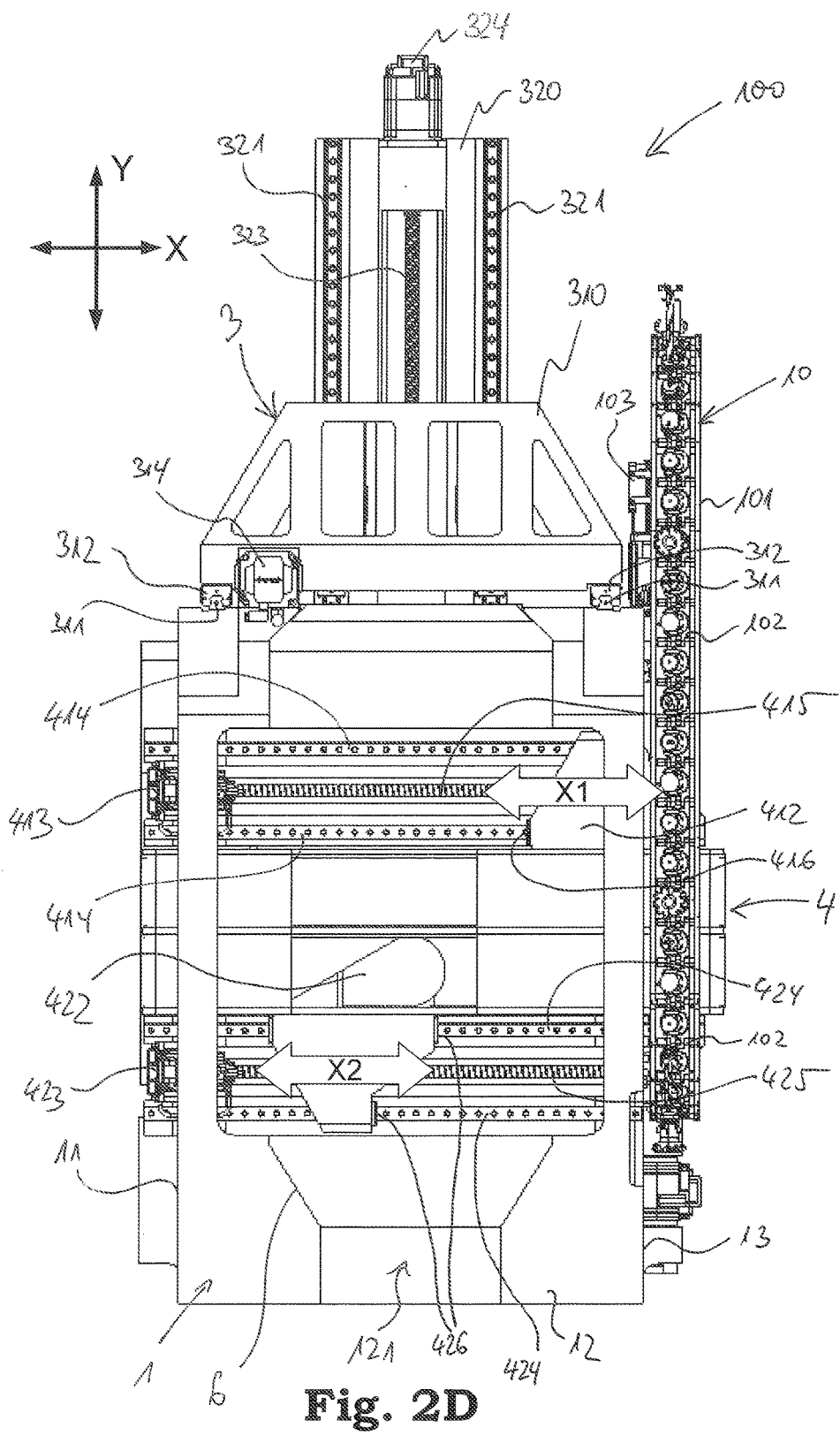
FIG. 2D shows, by way of example, a rear view of the machine tool from FIG. 1.
Figure 2E:
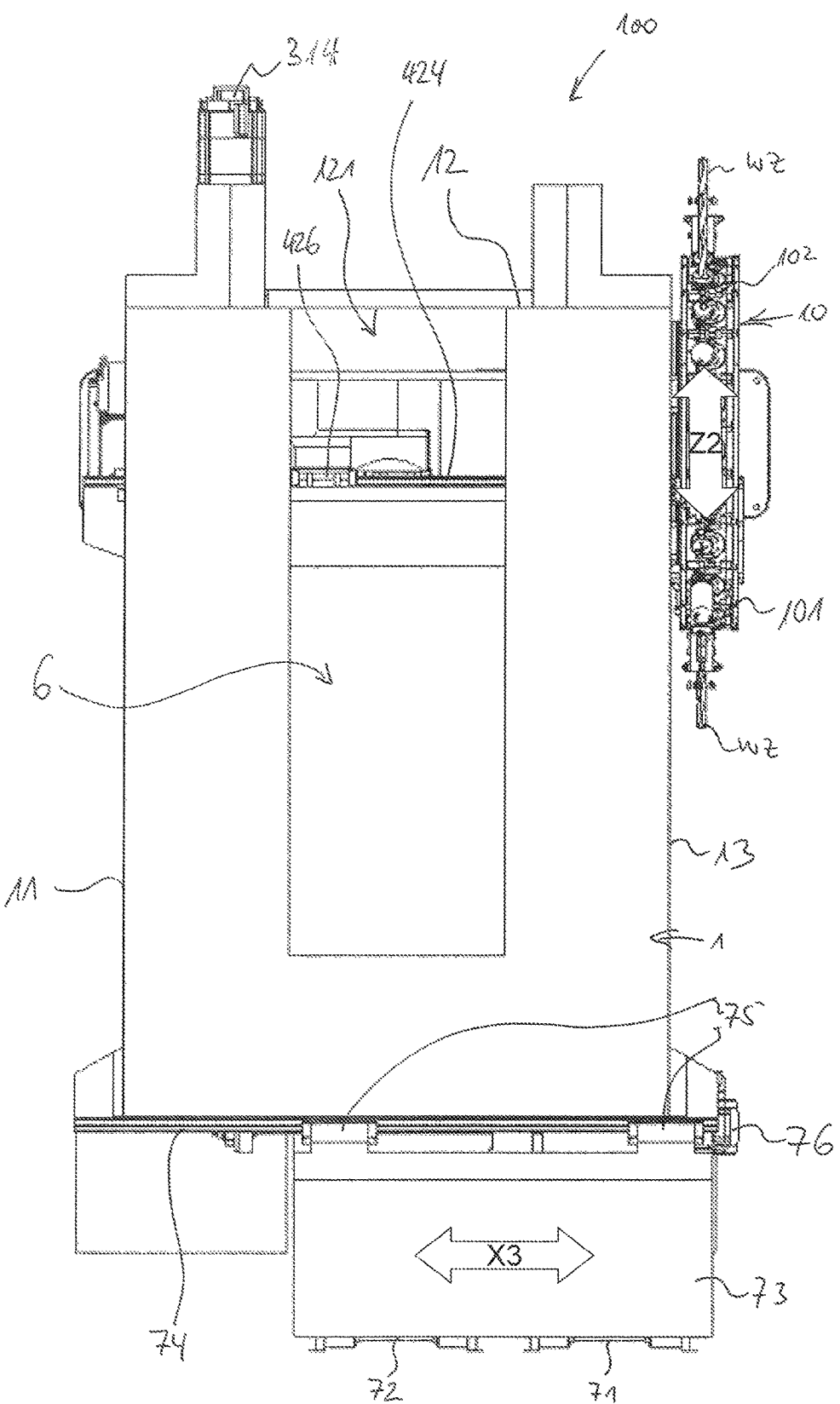
FIG. 2E shows, by way of example, a bottom view of the machine tool from FIG. 1.
Figure 2F:
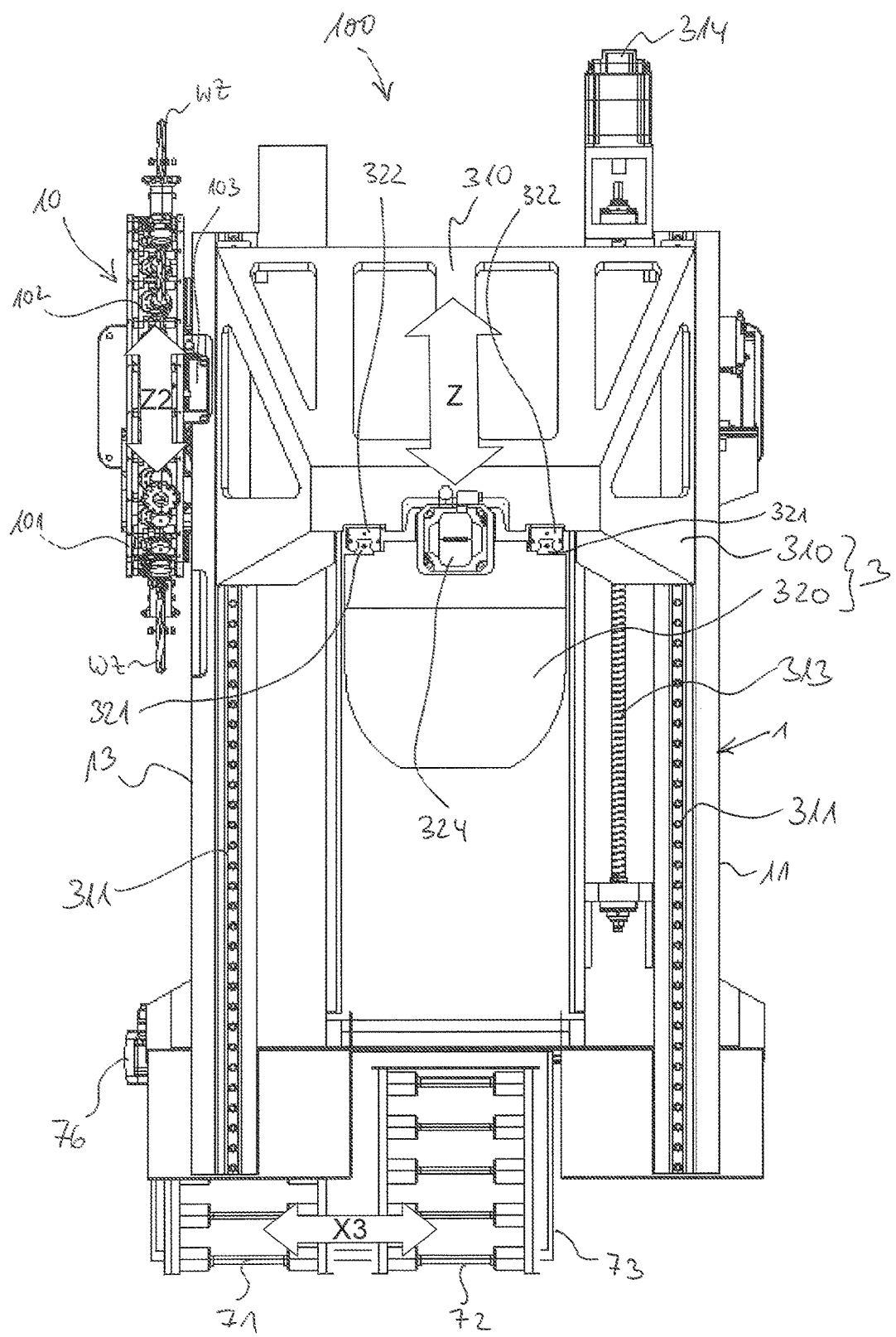
FIG. 2F shows, by way of example, a top view of the machine tool from FIG. 1.
Figure 3A:
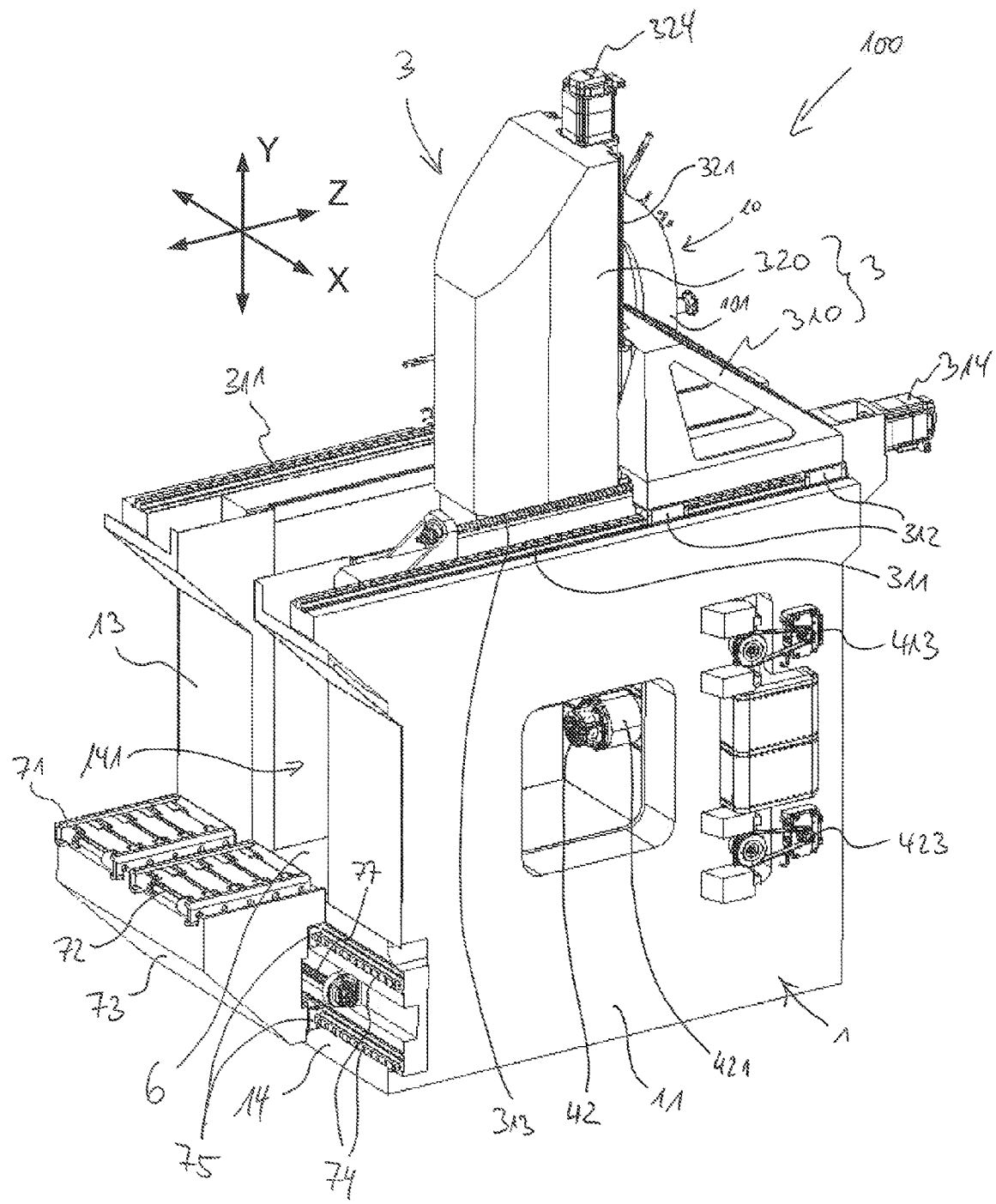
FIGS. 3A to 3D show further exemplary perspective views of the machine tool from FIG. 1.
Figure 3B:
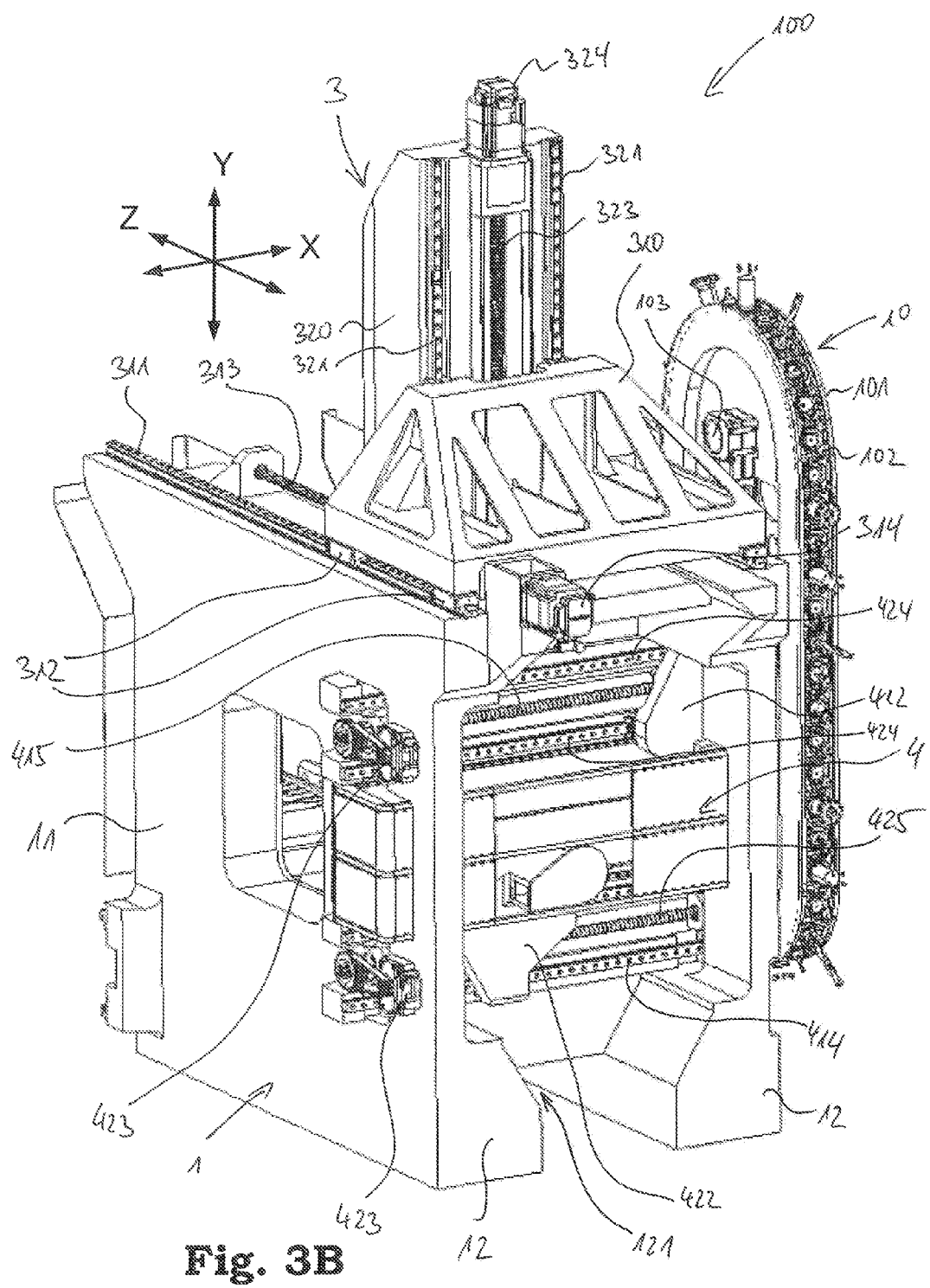
Figure 3C:
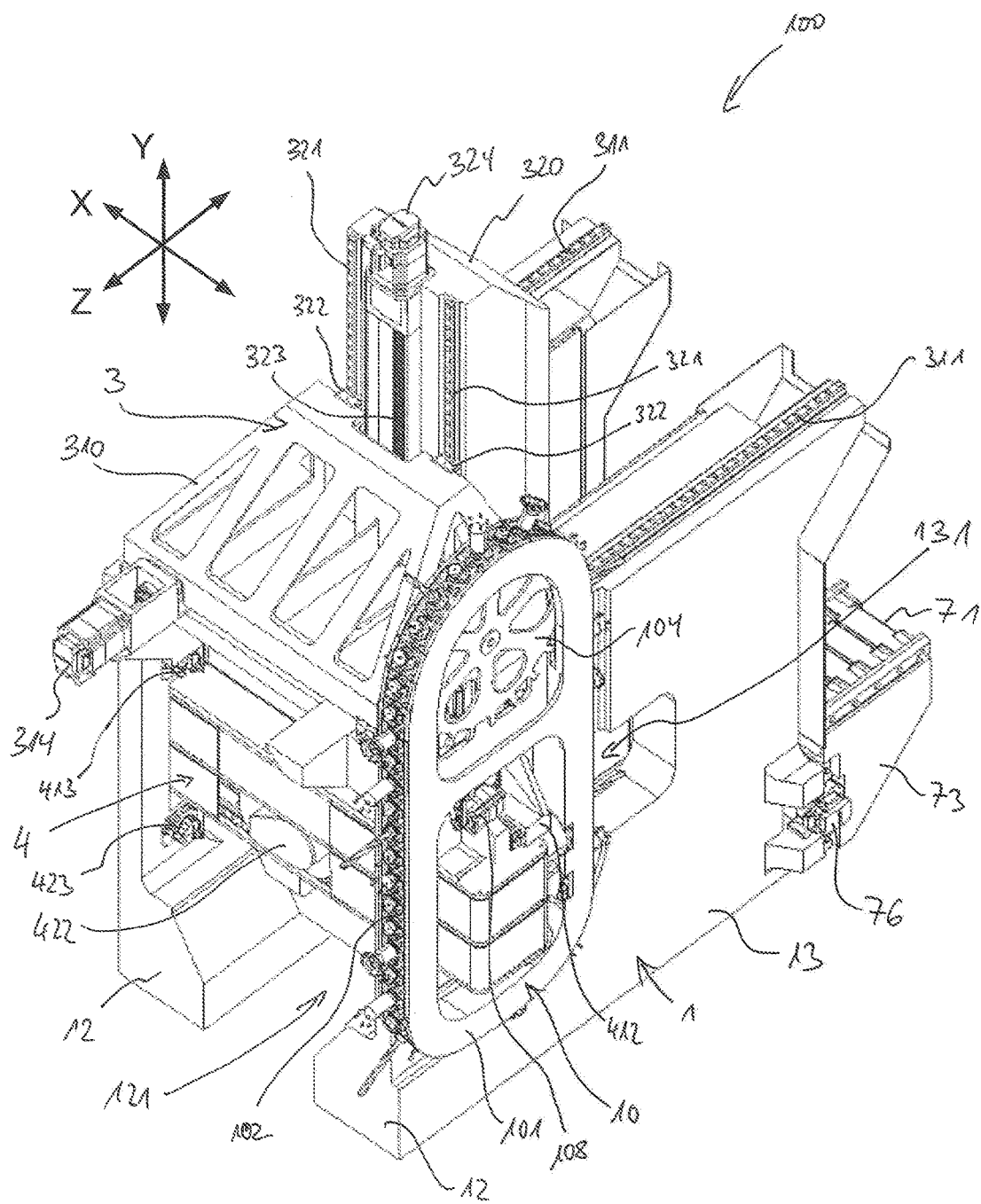
Figure 3D:
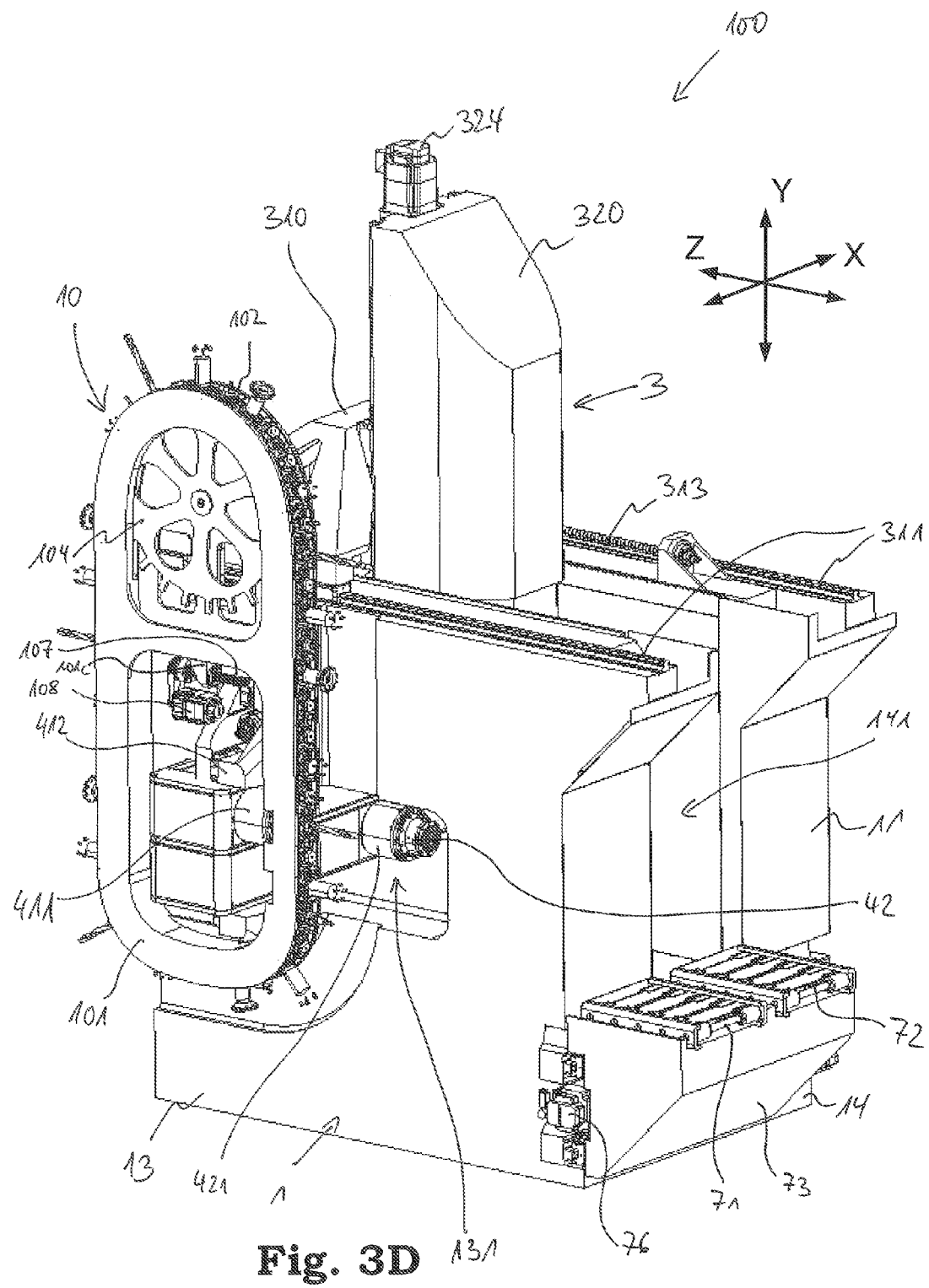

With respect to the embodiment according to FIGS. 1 to 3D, FIG. 1 shows an exemplary perspective view of the machine tool 100 (inclined from the left-hand upper front); FIG. 2A shows an exemplary front view of the machine tool 100; FIG. 2B shows an exemplary right-hand side view of the machine tool 100; FIG. 2C shows an exemplary left-hand side view of the machine tool 100; FIG. 2D shows an exemplary rear view of the machine tool 100; FIG. 2E shows an exemplary bottom view of the machine tool 100; FIG. 2F shows an exemplary top view of the machine tool 100; FIG. 3A shows a further exemplary perspective view of the machine tool 100 (inclined from the right-hand upper front); FIG. 3B shows a further exemplary perspective view of the machine tool 100 (inclined from the left-hand upper rear); FIG. 3C shows a further exemplary perspective view of the machine tool 100 (inclined from the right-hand upper rear); and FIG. 3D shows a further exemplary perspective view of the machine tool 100 (inclined from the left-hand upper front).

The machine tool 100 according to FIGS. 1 to 3D comprises a machine frame 1 which can optionally be paced on pedestal elements (not shown). The exemplary structure of the machine frame 1 is shown in FIGS. 1 to 3D and is still well visible in FIGS. 4 and 6A to 6C. The processing area of the machine tool 100 is preferably formed between the opposite carrier portions 11 and 13 and between the opposite carrier portions 12 and 14.

Figure 4:
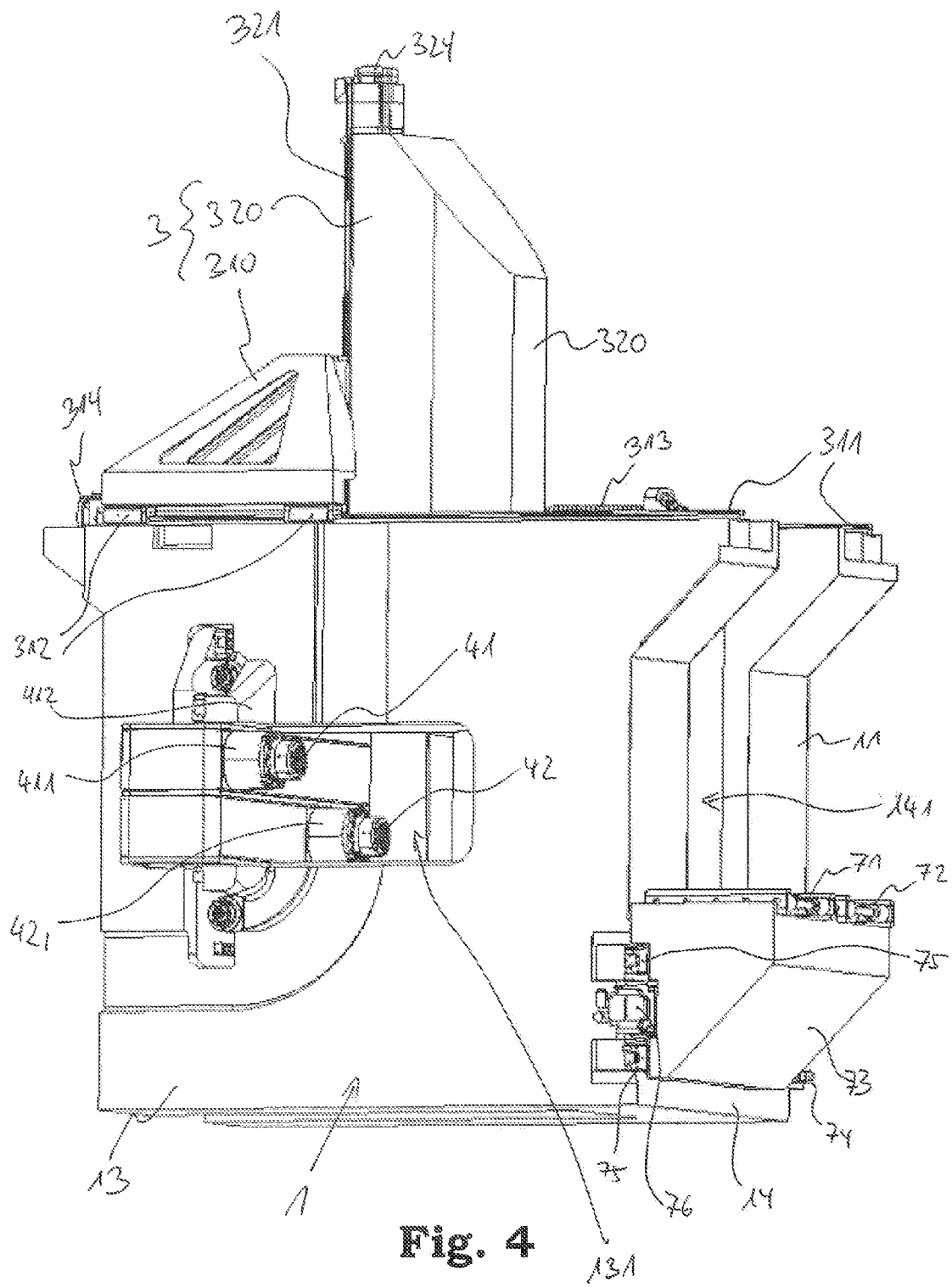
FIG. 4 shows, by way of example, a perspective view of the machine tool from FIG. 1 (e.g., without tool magazine)
Figure 6A:
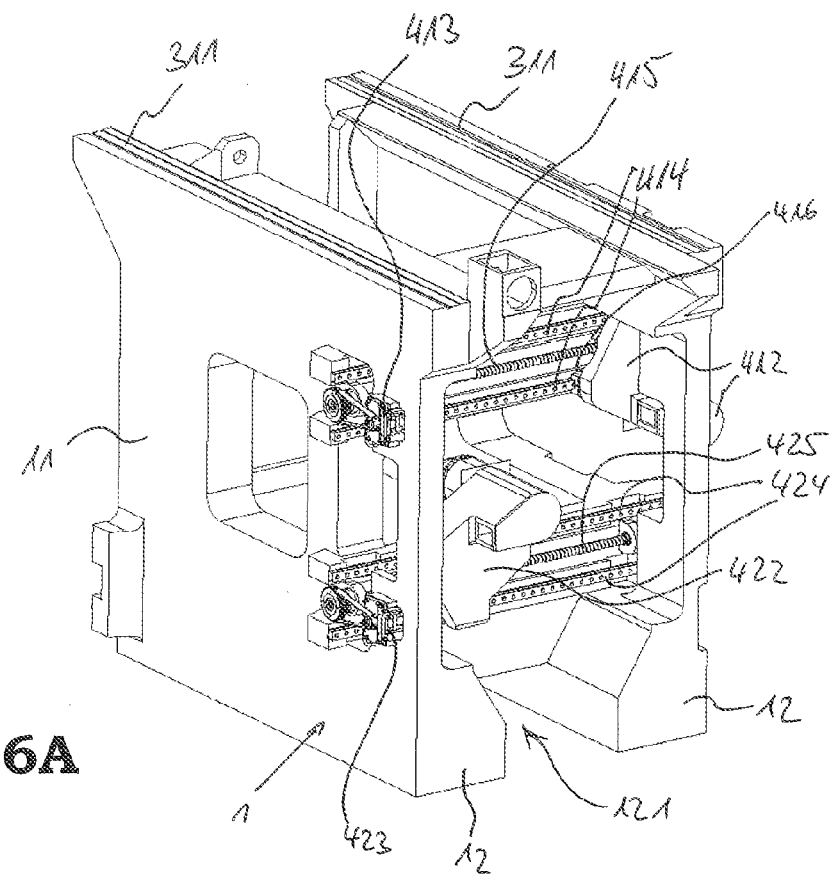
FIGS. 6A to 6C show, by way of example, perspective vies of the machine tool from FIG. 1 (e.g., without tool magazine and without axis slide assembly)
Figure 6B:
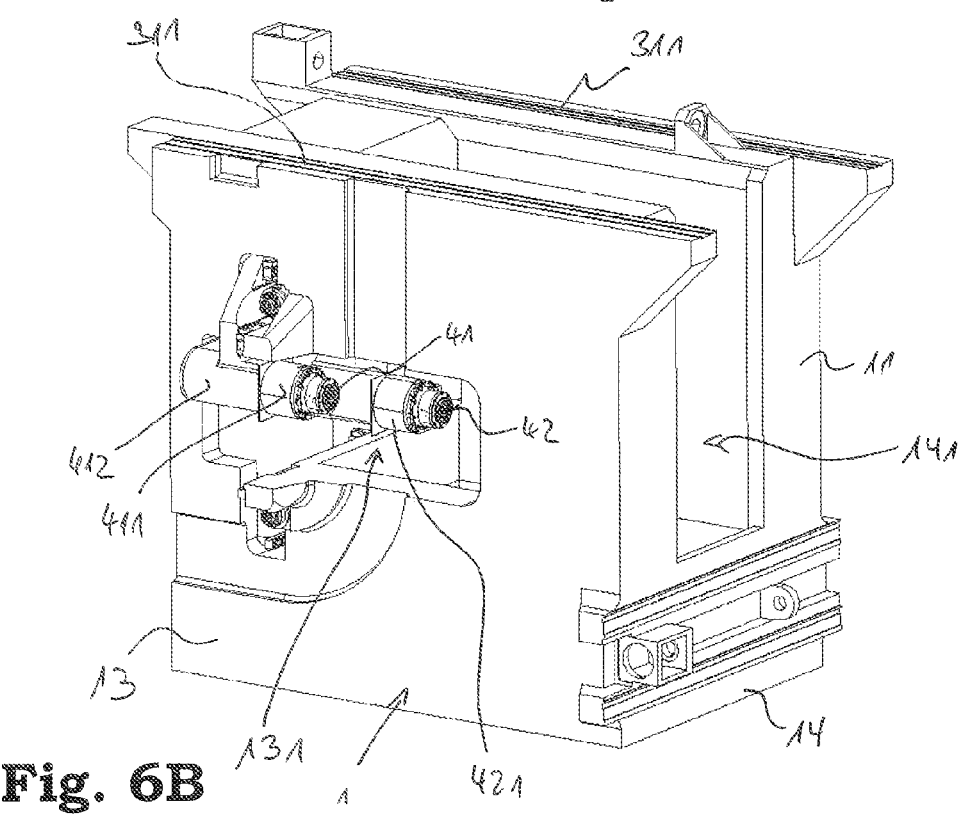
Figure 6C:
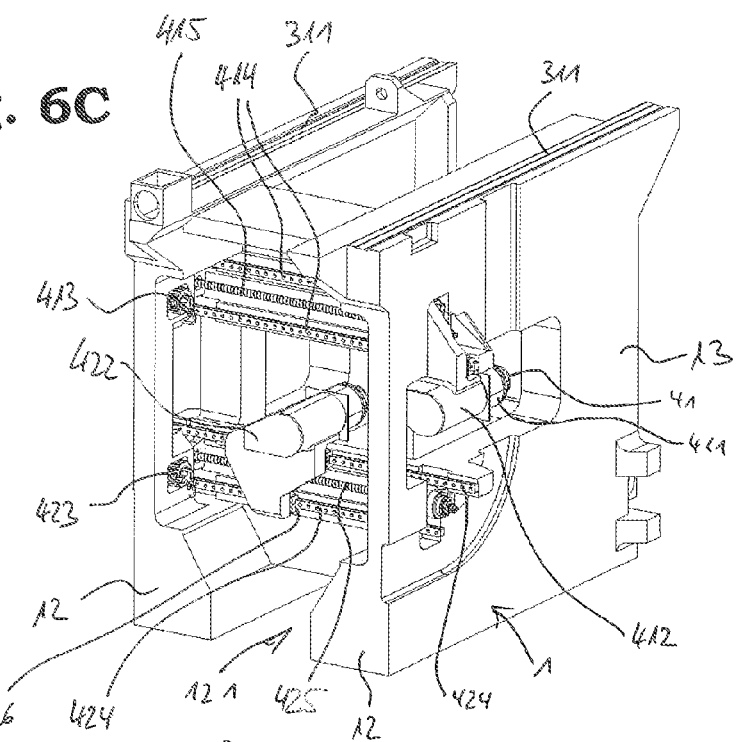

Here, FIG. 4 shows an exemplary perspective view of the machine tool 100 from FIG. 1 (by way of example without tool magazine 10), and FIGS. 6A to 6C show exemplary perspective views of the machine tool 100 (by way of example without tool magazine 10 and without axis slide assembly 3), inclined from the left-hand upper front (FIG. 4), inclined from the right-hand upper rear (FIG. 6A), inclined from the left-hand upper front (FIG. 6B) and inclined from the left-hand upper rear (FIG. 6C), respectively.

The machine frame 1 comprises a first carrier portion 11 (on the right-hand side of the machine tool 100, viewed from the front), a second (rear) carrier portion 12, and a third carrier portion 13 (on the left-hand side of the machine tool 100, viewed from the front). On the lower front side of the machine frame 1, a fourth carrier portion 14 is provided, by way of example, which carries, e.g., a conveying device carrier slide 73 of a subsequently described workpiece conveying device 7, said slide being horizontally movable in the X-direction.

The first carrier portion 11 and the third carrier portion 13 of the machine frame 1 carry, by way of example, a movable axis slide assembly 3, which is arranged, e.g., above the machine frame 1 and which has the Y- and Z-linear axes and also the circular axes B and C of the machine kinematics.

Figure 5A:
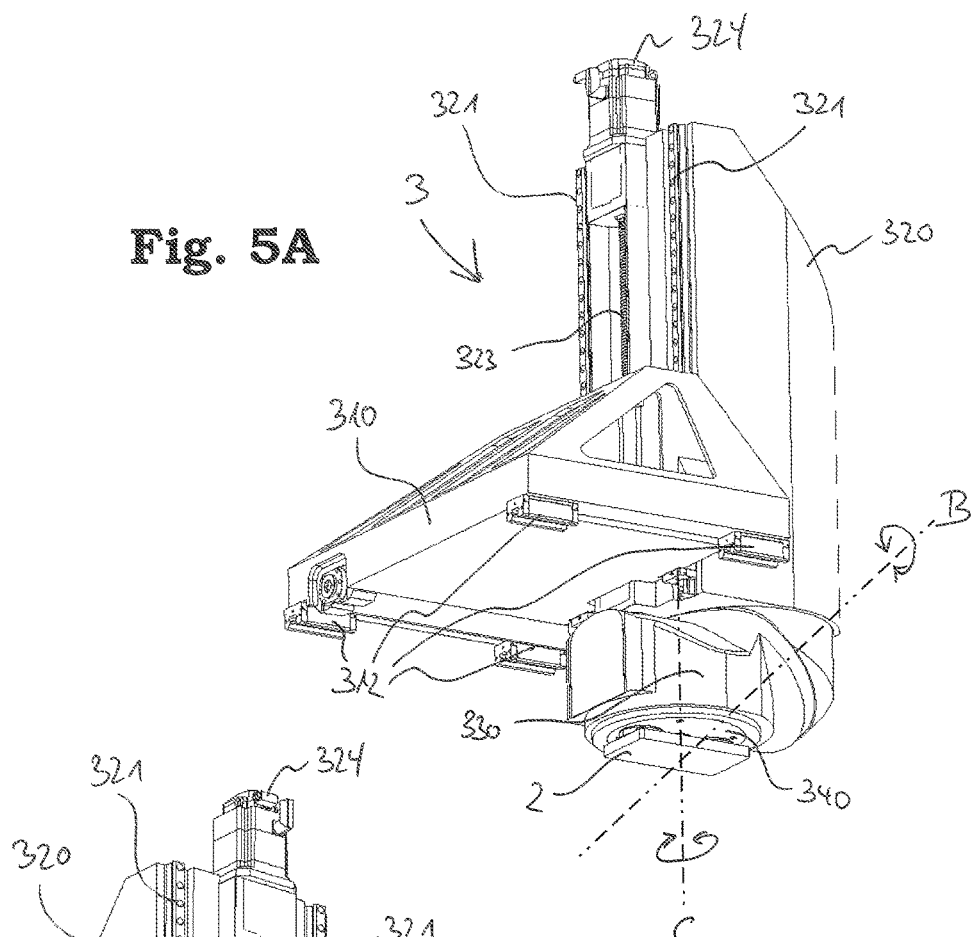
FIGS. 5A and 5B show exemplary perspective views of the axis slide assembly of the machine tool from FIG. 1.
Figure 5B:
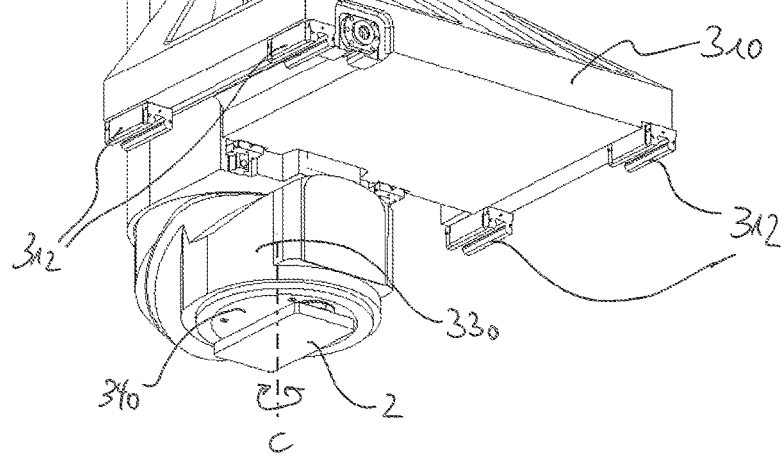

FIGS. 5A and 5B show, by way of example, perspective views of the axis slide assembly 3 of the machine tool 100 from FIG. 1. The axis slide assembly 3 comprises, e.g., a first axis slide 310 of the horizontal Z-axis and a second axis slide 320 of the vertical Y-axis as well as a swivel head 330 of the B-axis and a rotary element 340 of the C-axis.

In particular, the first axis slide 310 can be movably mounted on the machine frame 1 of the machine tool 100, the first axis slide 310 being provided as a base of the axis slide assembly 3 and a movement of the first axis slide 310 moving the entire axis slide assembly 3, so to speak as a unit.

The first axis slide 310 carries in particular the second axis slide 320, which is vertically movable along the first axis slide 310, and the second axis slide 320 carries the pivoting swivel head 330 of the B-axis, the swivel head 330 in turn carrying the turnable rotary element 340 of the C-axis. Insofar the Z-, Y-, B- and C-axes, e.g., build on one another. In the following, these drive axes of the machine kinematics are specified, e.g., by way of the axis slide assembly 3.

The Z-axis comprises in addition to the first axis slide 310 horizontally movable the Z-direction, e.g., also first axis guides 311, which are arranged on the carrier portions 11 and 13 of the machine frame 1 and on which, e.g., the first axis slide 310 is guided in linearly movable fashion in the Z-direction on the first axis guide elements 312, a rotatably mounted first threaded shaft 313 and a first axis drive 314 for rotatorily driving the first threaded shaft 313.

The first axis guides 311 run, by way of example, in a horizontal direction (Z-direction), which extends, e.g., horizontally from the front side of the machine tool 100 to the rear side of the machine tool 100, and are arranged, e.g., on the machine frame 1 and in particular on the carrier portions 11 and 13. The first threaded shaft 313 and the first axis drive 314 are arranged, e.g., on the first carrier portion 11 of the machine frame 1, and the first threaded shaft 313 extends, e.g., horizontally and parallel to the axis guide 311 extending on the first carrier portion 11 in the Z-direction.

The first axis slide 310 is mounted, e.g., in the Z-direction in horizontal and linear fashion in such a way that it can move by way of the first axis guide elements 312, which are arranged, by way of example, on the bottom side of the first axis slide 310, on the first axis guides 311 and comprises, e.g., a threaded nut 315, which is placed or arranged on the first threaded shaft 313 (see, e.g., FIGS. 5A and 5B) in such a way that a linear movement of the first axis slide 310 can be driven in the direction of the first axis guides 311 by way of the coupling via the first threaded shaft 313 by the first drive 314.

The Y-axis comprises in addition to the second axis slide 320, e.g., further second axis guides 321, on which the second axis slide 320 is guided by, way of example, vertically in the Y-direction, a rotatably mounted threaded shaft 323 and a second axis drive 324 for rotatorily driving of the second threaded shaft 323.

The second axis guides 321 run, e.g., in a vertical direction (Y-direction), which extends, e.g., perpendicularly to the Z-direction of the Z-axis and perpendicularly to the below described X-direction of the X-axes, and are arranged, e.g., on the first axis slide 310 of the Z-axis. The second threaded shaft 323 and the second axis drive 324 are arranged, e.g., on the second axis slide 320 and the second threaded shaft 323 extends, by way of example, vertically and parallel to (and between) the axis guides 321 running on the second axis slide 320 in the Y-direction.

The second axis slide 320 is mounted by way of second axis guide elements 322, which are arranged, by way of example, on the front side of the first axis slide 310, e.g., vertically in the Y-direction in a linearly movable fashion via the second axis guides 331 on the second axis slide 320.

The Y-axis comprises, by way of example, a threaded nut (not shown) held on the first axis slide 310 and placed or arranged on the second threaded shaft 323, such that a linear movement of the second axis slide 320 towards the second axis guides 321 along the first axis slide 310 can be driven by way of the coupling via the second threaded shaft 323 by the second drive 324.

On the bottom side of the second axis slide 320, e.g., a swivel head 330 is held which is mounted in turnable or pivoting fashion on the second axis slide 320 by way of a rotational axis of the B-axis which is aligned in inclined fashion in relation to the vertical Y-axis.

By way of example, the rotational axis B of the B-axis is inclined by 45 degrees in relation to the plane of the X- and Z-directions and is arranged, e.g., in the plane of the Y- and Z-directions. The drive or drives and possible gear transmissions and bearings of the swivel head 330 are not shown in FIGS. 5A and 5B, but can be arranged, e.g., in the interior of the second axis slide 320 and/or in the interior of the swivel head 330.

On the bottom side of the swivel head 330, e.g., a rotary element 340 of the rotary axis (C-axis) is held which is mounted on the swivel head 330 in rotary and/or pivoting fashion, by way of a rotational axis of the C-axis which is aligned or can be aligned in parallel to the vertical Y-axis (see, e.g., FIGS. 5A and 5B).

It should here be noted that in this embodiment the rotational axis C of the C-axis (rotary axis) co-swivels when the swivel head 330 is pivoted and thus is not fixed in stationary fashion in space but rather orients itself by the angular position of the swivel head 330. For example, it is possible to move the rotational axis C of the C-axis (rotary axis) from the position shown in FIGS. 5A and 5B by pivoting the swivel head 330 by 180 degrees about the rotational axis B of the B-swivel axis into a horizontal position aligned in parallel to the Z-direction of the Z-axis.

The drive or drives and possible gear transmissions and bearings of the rotary element 340 are not shown in FIGS. 5A and 5B, but can be arranged, e.g., in the interior of the second axis slide 320 and/or in the interior of the swivel head 330.

For example, a workpiece clamping device 2 (e.g., having a workpiece pallet holder) is arranged on the lower side of the rotary element 340. The workpiece clamping device 2 is configured, by way of example, to clamp a workpiece pallet in order to clamp a workpiece WS on the workpiece pallet holder of the workpiece clamping device 2, e.g., by an automatic gripping mechanism and/or also by electro-magnetic or inductive clamping mechanisms.

Here, the machine tool 100 of the embodiment according to FIGS. 1 to 3D is, e.g., configured to process workpieces WS by way of overhead processing on the machine tool 100, e.g., by clamping a workpiece WS attached to a workpiece pallet for the overhead processing in suspended fashion (or in overhead suspended fashion) on the machine tool with an upwards facing workpiece pallet on the workpiece pallet holder of the workpiece clamping device 2.

The suspended overhead processing of a workpiece WS results in advantageous fashion in an optimum chip falling behavior when the workpiece WS is machined since the chips can fall down without impediment where, e.g., a simply formed (e.g., funnel-shaped, pan-shaped or box-shaped) chip collecting pan 6 is provided in order to collect the chips. It is advantageous that no drive or processing components which might be soiled by chip fall have to be arranged below the workpiece WS clamped in suspended fashion. The result is an advantageously unimpeded chip fall downwards optionally in the entire processing area of the machine tool. See in particular the sectional views according to FIGS. 7A and 7B.

Here, in particular no complex and space-consuming, machine integrated chip conveying mechanisms has to be provided but it is advantageously fully sufficient, space-saving and a simple cost-effective design to use a simple chip conveyor (optionally according to a conventional design) which can easily be inserted together with the conveying portion directly into a chip discharge opening 121 in the rear carrier portion 12 of the machine frame 1, in particular without having to provide any further complex, costly, machine integrated chip conveying device.

As already described above, the machine frame 1 comprises, e.g., on the lateral side first and third carrier portions 11 and 13, which, e.g., carry the above described axis slide assembly 3 and a rear carrier portion 12 in which, e.g., the above described chip discharge opening 121 is formed.

For example, a machining area of the machine tool is formed between the carrier portions 11, 12 and 13, in which a workpiece WS clamped on the above described workpiece clamping device 2 can be processed. The above described chip collecting pan 6 is arranged, by way of example, on the bottom side of the machining area between the carrier portions 11, 12 and 13.

Furthermore, the machine tool 100 according to the embodiment of FIGS. 1 to 3D comprises, e.g., a conveying device 7, which, by way of example, is arranged or held on a front side of the machine frame 1 on a conveying device carrier slide 73. The conveying device carrier slide 73 is movable, e.g., in a horizontal X-direction by way of a linearly drivable X3-axis.

For this purpose, e.g., carrier slide guides 74 are arranged on the front side of the carrier portion 14 of the machine frame 1, where the conveying device carrier slide 73 is movably mounted by way of carrier slide guiding elements 75. For example, a conveying device threaded shaft 77 driven by a conveying device drive 76 is mounted between and parallel to a carrier slide guides 74, said conveying device carrier slide 73 meshing with the conveying device threaded shaft by way of a threaded nut (not shown) and moving therealong by rotation of the conveying device threaded shaft 77 horizontally in the X-direction.

The conveying device 7 comprises, e.g., an input conveying portion 71 for the optionally automatic supply of a workpiece to be processed to the processing area of the machine tool 100 and, e.g., an output conveying portion 72 for the optionally automatic discharge or removal of a processed workpiece from the processing area of the machine tool 100.

The input conveying portion 71 of the conveying device 7 can have, e.g., a workpiece clamping position (clamping position) where a workpiece WS to be processed can be received and clamped by the workpiece clamping device 2 of the axis slide assembly 3, e.g., after the workpiece clamping device 2 placed and/or could place a previously clamped and already processed workpiece WS at a workpiece unclamping or output position (unclamping position), for the, e.g., optionally automatic removal by the output conveying portion 72 of the conveying device 7, said output conveying portion including the workpiece unclamping position and/or output position.

The conveying device 7 can preferably comprise one or more further conveying portions upstream of the input and output conveying portions 71 and 72 of the conveying device 7, e.g., to convey workpieces to the input conveying portion 71 of the conveying device 7 and/or to remove workpieces from the output conveying portion 72 of the conveying device 7.

In the embodiment according to FIGS. 1 to 3D, the input and output conveying portions 71 and 72 of the conveying device 7 are made, e.g., as roller conveyor portions, but the present disclosure is not limited to such designs and the conveying device 7 can comprise additionally or alternatively also different conveyor portions and/or in further embodiments of the machine tool be provided with additional or alternative automation machines, handling machines, manipulators and/or pickup robot device, optionally for the automatic removal and/or provision of workpieces.

In other embodiments, the conveying device carrier slide 73 can also be provided as a further portion of the machine frame 1 or can be attached thereto. Therefore, the machine frame 1 has, e.g., in addition to the carrier portions 11 to 13 a stationary conveying device carrier portion 73.

Furthermore, the machine tool 100 according 1 to FIGS. 1 to 3D comprises, by way of example, a spindle assembly 4 with two tool-carrying work spindles 41 and 42 which are held and mounted in rotatorily drivable fashion, e.g., in the spindle housings 411 and 421. The spindle housings 411 and 421 preferably comprise in the interior thereof respective spindle drives (not shown) for driving the work spindles 41 and 42 or for rotatorily driving tool interfaces and/or tools, in particular milling or drilling tools, received by the work spindles 41 and 42.

According to embodiments, the work spindles 41 and 42 can here be configured to receive respectively equal or equivalent tool interfaces. In further embodiments, it is, however, advantageous for the work spindles to be respectively configured in such a way that they can receive respectively different tool interfaces, e.g., of a different type and/or a different size. Thus, processing with differently large or different workpiece types or tool interface types is possible in quick succession and without down times.

Figure 7A:
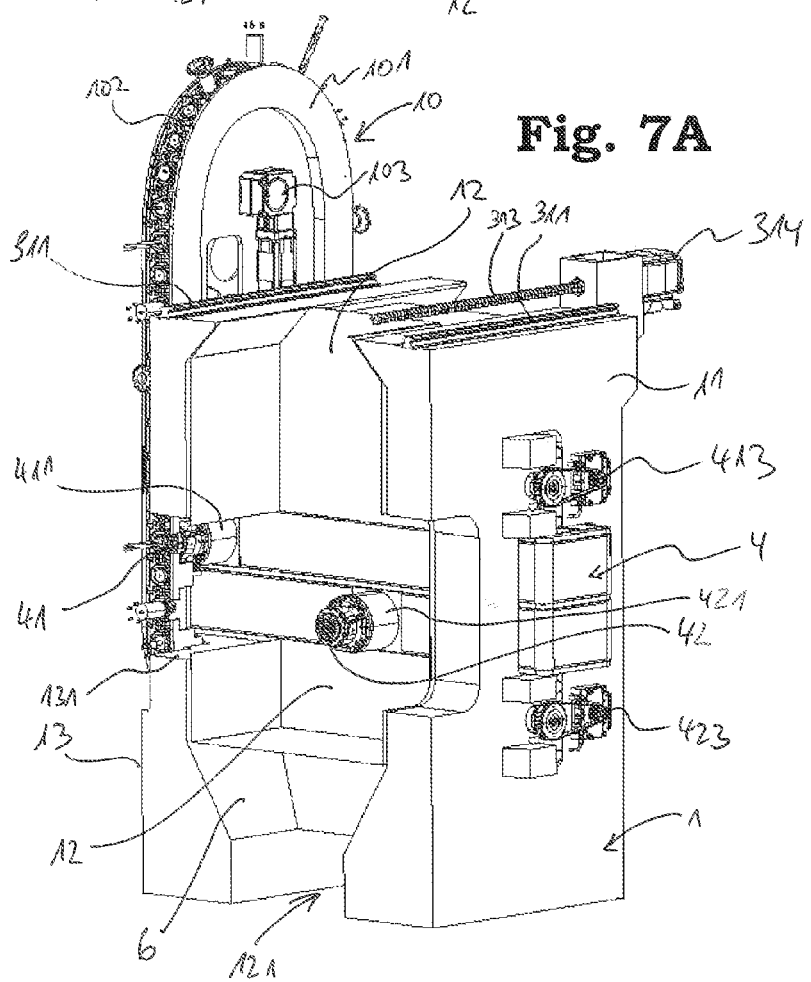
FIG. 7A shows an exemplary perspective sectional view of the machine tool from FIG. 1 with a vertical sectional plane perpendicularly to the Z-axis direction (e.g., without axis slide assembly)
Figure 7B:
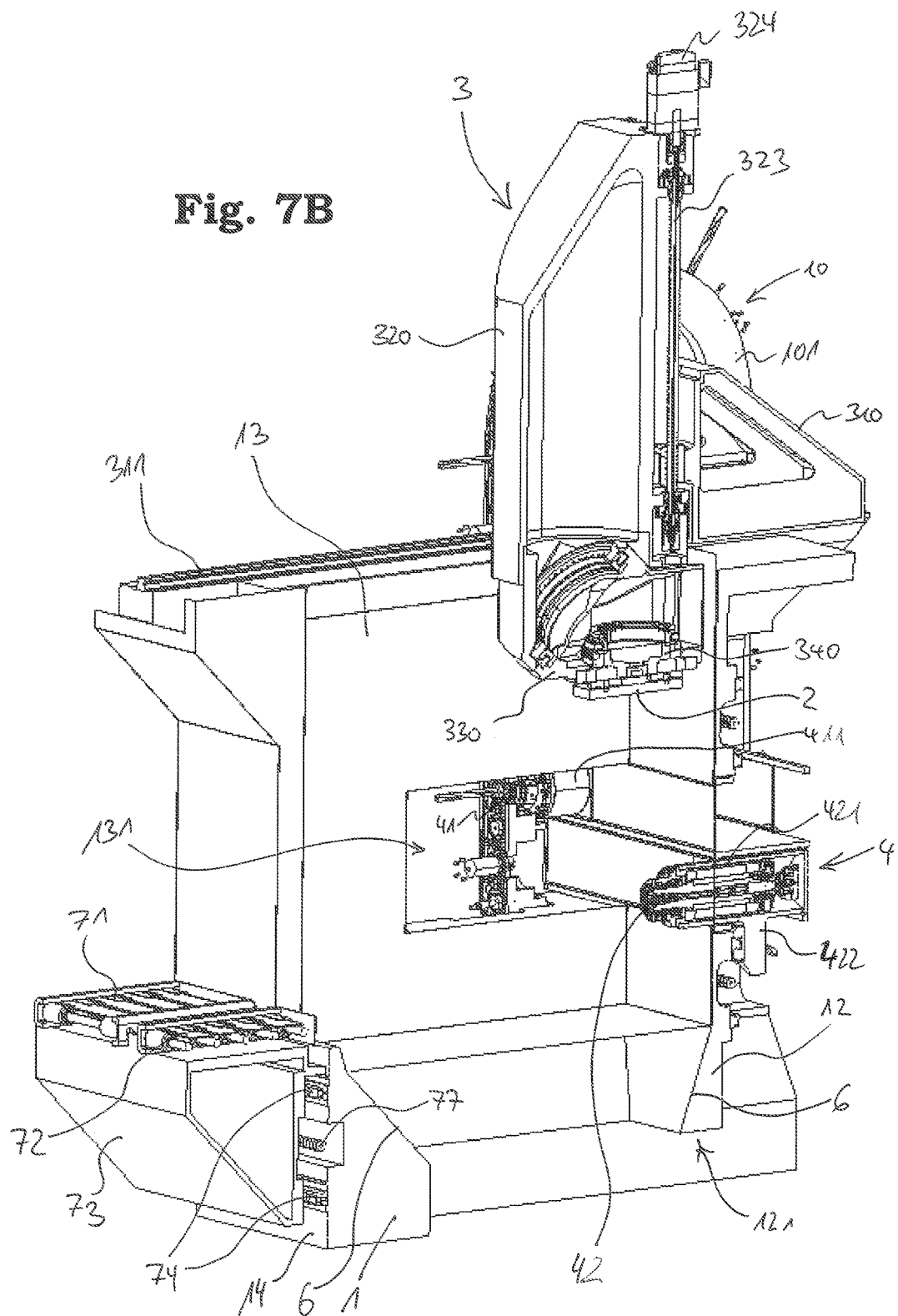
FIG. 7B shows an exemplary perspective sectional view of the machine tool from FIG. 1 with a vertical sectional plane perpendicularly to the X-axis direction.

FIG. 7A shows an exemplary perspective sectional view of the machine tool 100 from FIG. 1 having a vertical sectional plane perpendicularly to the Z-axis direction (e.g., without axis slide assembly), FIG. 7B shows an exemplary perspective sectional view of the machine tool 100 from FIG. 1 having a vertical sectional plane perpendicularly to the X-axis direction.

The work spindles 41 and 42 are respectively held and mounted in rotatorily drivable fashion in the spindle housings 411 and 421 and the spindle housings 411 and 421 are respectively held at respective spindle carrier slides 412 and 422.

The above (first) work spindle 41 with the spindle housing 411 can be moved by way of the spindle carrier slide 412 in the X-direction (X1-axis). For this purpose, first spindle carrier guiding elements 416 are arranged, e.g., on the rear side of the spindle carrier slide 412, where the spindle carrier slide 412 is mounted in linearly movable fashion on spindle carrier guides 414 aligned horizontally in the X-direction. The spindle carrier guides 414 are aligned, e.g., in the X-direction and are arranged, e.g., on the rear side of the carrier portion 12 of the machine frame 1 of the machine tool 100 (see, e.g., FIG. 2D).

For example, a first spindle carrier threaded shaft 415 is arranged between the first spindle carrier guides 414 of the X1-axis and parallel thereto and is driven via a spindle carrier drive 413 of the X1-axis, which is arranged, e.g., on the carrier portion 11 of the machine frame 1 of the machine tool 100.

The X1-axis comprises, by way of example, a threaded nut (not shown) held on the first spindle carrier slide 412 and placed or arranged on the first spindle carrier threaded shaft 415. As a result, a linear movement of the first spindle carrier slide 412 in the direction of the first spindle carrier guides 414 can be driven in the X-direction by way of the coupling via the first spindle carrier threaded shaft 415 by the first spindle carrier drive 413.

Here, the upper/first work spindle 41 can be moved by way of the X1-axis in the X-direction and can be moved in particular for a tool change on the work spindle 41 from a processing position in the processing area of the machine tool 100 to a tool change position at the tool magazine 10 (see, e.g., FIG. 8C). In addition, the upper/first work spindle 41 can be moved while a workpiece is processed by way of the X1-axis in the X-direction or horizontally in the X-direction in relation to the workpiece clamped on the workpiece clamping device 2 of the axis slide assembly 3.

The lower (second) work spindle 42 with the spindle housing 421 can be moved in the X-direction by way of the spindle carrier slide 422 (X2-axis). For this purpose, second spindle carrier guiding elements 426 are arranged, by way of example, on the rear side of the spindle carrier slide 422, where the spindle carrier slide 422 is mounted in linearly movable fashion on spindle carrier guides 424 which are horizontally aligned in the X-direction. The spindle carrier guides 424 are aligned, e.g., in the X-direction and, e.g., on the rear side of the carrier portion 12 of the machine frame 1 of the machine tool 100 (see, e.g., FIG. 2D).

For example, a second spindle carrier threaded shaft 425 is arranged between the second spindle carrier guides 424 of the X2-axis and parallel thereto and is driven via a spindle carrier drive 423 of the X2-axis, said drive being arranged, e.g., on the carrier portion 11 of the machine frame 1 of the machine tool 100.

The X2-axis comprises, by way of example, a threaded nut (not shown) held on the second spindle carrier slide 422 and placed or arranged on the second spindle carrier threaded shaft 425, such that a linear movement of the second spindle carrier slide 422 can be driven in the direction of the second spindle carrier guides 424 in the X-direction by way of the coupling via the second spindle carrier threaded guide 425 by the second spindle carrier drive 423.

Here, the lower/second work spindle 42 is movable in the X-direction by way of the X2-axis and can be moved in particular for a tool change on the work spindle 42 from a processing position in the processing area of the machine tool 100 (see, e.g., FIGS. 2A and 7A) to a tool change position at the tool magazine 10. In addition, the lower/second work spindle 42 can be moved while a workpiece is processed by way of the X2-axis in the X-direction or horizontally in the X-direction in relation to the workpiece clamped on the workpiece clamping device 2 of the axis slide assembly 3.

Furthermore, the machine tool 100 comprises, by way of example, the tool magazine 10 arranged on the carrier portion 13 of the machine frame 1. The tool magazine 10 is arranged, e.g., on the outer side of the third carrier portion 13 of the machine frame 1 and is held at or attached to, e.g., the third carrier portion 13.

Therefore, e.g., a tool magazine 10 and a tool change opening 131 formed in the third carrier portion 13 of the machine frame 1 are provided for the tool change on the machine tool. For example, the tool magazine 10 is made as a chain magazine and comprises a tool magazine carrier 101 and a movable, tool-carrying tool magazine chain 102 which is circumferentially arranged on the tool magazine carrier 101, wherein the tool magazine carrier 101 is mounted or can be mounted, e.g., on the carrier portion 13 of the machine frame 1. In further embodiments, the tool magazine carrier 101 can also be held by a separate column or column frame which can optionally be installed separately from the machine frame 1 and independently next to or behind the machine tool.

The tool magazine 10 is made, e.g., as a chain magazine and comprises the tool magazine carrier 101 and the tool magazine chain 102, which is held on the outer circumference of the tool magazine carrier 101 and which can be moved by way of a magazine chain drive gear 104 driven by a magazine chain drive 103. A plurality of tools WZ or tool interfaces (e.g., steep taper tool interfaces, hollow shaft cone tool interfaces and/or Morse taper tool interfaces) can be held on the magazine chain 102.

For example, the tool magazine 10 is in particular configured to circumferentially hold, mount or have available a plurality of tools and/or tool-holding tool interfaces (e.g., steep taper tool interfaces, hollow shaft cone tool interfaces and/or Morse taper tool interfaces), in particular preferably with an orientation of the tool axes that is radial or perpendicular to the magazine chain 102. For this purpose, the tool magazine 10 can comprise circumferentially a plurality of tool receptacles for receiving tools and/or tool interfaces which are all preferably arranged on links of the magazine chain 102.

It is pointed out that the present disclosure is by no means limited to machine tools with integrated tool magazine and that, in addition, the present disclosure is by no means limited to a certain design of a tool magazine, such as the chain magazine merely shown, by way of example, in FIG. 1. On the contrary, a plurality of different tool magazine types can be used in further embodiments, in particular, e.g., rack-type magazines, wheel-type magazines, multi-wheel-type magazines or even hybrid tool magazines which combine various types of tool magazines in one tool magazine.

FIGS. 8A and 8B show, by way of example, perspective views of the spindle assembly 4 and of the tool magazine 10 of the machine tool 100 from FIGS. 1 to 3D, and FIG. 8C shows an exemplary perspective detailed view of the work spindle 41 of the machine tool from FIG. 1 at the tool change position.

In FIGS. 1 to 3D, the second work spindle 42 is positioned, e.g., at an operating position (processing position) which is disposed, e.g., centrally with respect to the processing area between the carrier portions 11 and 13 of the machine frame 1. See, e.g., FIGS. 2A, 3A, 3D, 4, 6A and 7A and 7B. For example, the first work spindle 41 is here positioned at a tool change position. See, e.g., FIGS. 4, 6B, 7A and 7B and in particular the detailed view according to FIG. 8C.

Here, FIG. 8C shows, by way of example, that the tools WZ and/or the tool interfaces are held or can be held on the tool holders WZH and/or tool holder elements, which are attached or can be attached to the links of the tool magazine chain 102.

At the tool change position of the first (upper) work spindle 41, the tool magazine carrier 101 has, e.g., a first change portion 101a where the work spindle 41 can move by way of the X1-axis in the X-direction horizontally on the tool magazine carrier 101 behind a chain link of the tool magazine chain 102 positioned at a change position at the change portion 101a to receive the tool WZ held therein.

In order to insert or remove the tool WZ into or from the work spindle 41, the tool magazine carrier 101 is movable, e.g., as a whole by way of the Z2-axis in the Z-direction (i.e., in particular parallel to the spindle axis of the work spindle 41) (see, e.g., FIG. 2C).

FIGS. 9A and 9B show, by way of example, perspective views of the tool magazine 10 of the machine tool 100 from FIG. 1.

The Z2-axis comprises magazine guides 105 aligned in the Z-direction (see, e.g., FIGS. 8A, 8B, 9A and 9B) which are movably mounted linearly on magazine guiding elements 106, wherein the magazine guiding elements 106 are arranged, e.g., on the carrier portion 13 of the machine frame 1 of the machine tool 100.

In addition, a magazine carrier drive 108 driving a magazine threaded shaft 107 aligned horizontally in the Z-direction is arranged on the carrier portion 13 of the machine frame 1 of the machine tool 100, wherein a threaded nut (not shown) meshes with a holding portion 101c of the magazine carrier 101 in such a way that a linear movement of the magazine carrier 101 in the direction of the magazine guides 105 can be driven in the Z-direction by way of the coupling via the magazine threaded shaft 107 by the magazine carrier drive 108.

In analogy to the work spindle 14, the tool magazine carrier 101 has, by way of example, a second change portion 101b on the tool change position of the second (lower) work spindle 42, on which the work spindle 42 can move by way of the X2-axis in the X-direction horizontally along the tool magazine carrier 101 behind a chain link of the tool magazine chain 102, which is positioned at a change position at the change portion 101b in order to receive the tool WZ held therein.

In order to insert or remove the tool WS into or from the work spindle 42, the tool magazine carrier 101 can, in turn, be moved by way of the above described Z2-axis in the Z-direction (i.e., in particular parallel to the spindle axis of the work spindle 42).

An advantage is that the tools can be directly introduced and replaced by way of the work spindles 41 and 42 at the tool magazine 10 and in particular no further tool change manipulators are required. As a result, the machine tool can be provided in an even more compact way.

In analogy to the movement of the above described linear axis slides 310 and 320 of the Y-axis and Z-axis and the rotation of the circular axes B and C of the axis slide assembly 3, it is possible to control the movement of the work spindles in the X-direction (X1-axis and X2-axis), e.g., via a numeric control device (CNC control unit and/or PLC control unit, optionally via an NC program or a manual input via a control panel of the numeric control by an operator).

The movement of the work spindles 41 and 42 in the X-direction and the movement of the conveying device slide 73 in the X-direction can also be controlled, e.g., via a numeric control device (CNC control unit and/or PLC control unit, optionally via an NC program or a manual input via a control panel of the numeric control by an operator). In analogy thereto, this also applies to the movement of the tool magazine carrier 101 in the Z-direction and/or the movement of the tool magazine chain 102.

A major advantage of the machine tool 100 according to the embodiment of FIGS. 1 to 3D is now the possibility of replacing a tool received at the work spindle 41, which is disposed at the tool change position of the machine tool 100, while at the same time the workpiece WS clamped on the tool clamping device 2 can be processed by way of a tool received on the work spindle 42, which is disposed at the processing position of the machine tool, without idle times or down times while the tool is changed. In addition, the work spindle 41 can be accelerated after receiving a newly introduced or exchanged tool, i.e., accelerated to the speeds of the spindle in the workpiece processing while the other work spindle 42 processes the workpiece WS at the same time still by way of the tool received therein.

As soon as the workpiece WS clamped on the workpiece clamping device 2 was processed by way of the tool received at the work spindle 42 or shall be processed by way of the tool introduced at the work spindle 41, the work spindle 41 can, e.g., be moved with the tool to be used by a simple and fast movement of the spindle carrier slide 412 in the X-direction from the tool change position to the processing position. As a result, the workpiece WS can be further processed virtually without any tool change time. At the same time, the work spindle 42 can be moved in the same step to the tool change position, as a result of which a tool change at the work spindle 42 is possible without having to noticeably interrupt the processing of the workpiece.

After the tool change, the work spindle 42 can be accelerated again to the required processing spindle speeds (e.g., from 15,000 to 20,000 min$^{-1}$), still while the workpiece can be processed by way of the tool received at the work spindle 41. Therefore, downtimes can be saved or approximately be avoided advantageously on account of the tool change time and on account of the subsequent acceleration period.

As soon as the workpiece WS clamped on the workpiece clamping device 2 was processed by the tool received on the work spindle 41 or shall be processed by the tool introduced at the work spindle 42, the work spindle 42 can be moved, e.g., by the tool to be used by simply and quickly moving the spindle carrier slide 422 in the X-direction from the tool change position on the processing position. As a result, the processing of the workpiece WS can be further processed virtually without any tool change time. At the same time, the work spindle 4 can be moved in the same step to the tool change position, as a result of which a new tool change is possible on the work spindle 41 without having to noticeably interrupt the processing of the workpiece. Therefore, the processing of the workpiece WS can again be continued virtually without any tool change time.

In addition, the work spindle 41 can again be accelerated, after the tool change, to the required processing spindle speeds (e.g., from 15,000 to 20,000 $\min^{-1}$), still while the workpiece can be processed by way of the tool received at the work spindle 42. Thus, down times resulting from the tool change time and from the subsequent acceleration time can advantageously be saved or roughly be avoided.

This results in a highly efficient processing time for the processing of the workpiece WS, even if many work steps requiring a large number of tool changes optionally in short succession should be necessary, virtually without any down times of the machine tool, as usually occur in tool changes on machine tools (including the acceleration time of the spindles to the processing speeds) and in addition with a highly advantageous compact design of the machine tool.

For example, the machine tool according to the embodiment of FIGS. 1 to 3D also comprises a protective cover mechanism 8 and/or a protective cover device which can optionally be opened and closed automatically. In particular, the protective cover apparatus 8 comprises, e.g., two protective cover portions 81a and 81b, which can preferably be opened and closed independently.

In the open state, the protective cover mechanism 8 renders possible, e.g., the movement of the work spindles between the processing position and the tool change position, and in the closed state, the closed protective cover mechanism 8 advantageously covers, e.g., the respective work spindle positioned at the tool change position, when viewed from the processing area of the machine tool.

In particular, a half-open protective cover apparatus 8 with a pulled-down or open (lower) protective cover portion 81b renders possible the movement of the lower work spindle 42 between the tool change position at the tool magazine 10 and the processing area of the machine tool 100 and with a pulled-up or open (upper) protective cover portion 81b it renders possible the movement of the upper work spindle 41 between the tool change position at the tool magazine 10 and the processing area of the machine tool 100. In the closed state, the protective cover mechanism 8 here preferably separates in advantageous fashion, e.g., the respective work spindle positioned at the tool change position on the tool magazine 10 completely from the processing area of the machine tool 100.

The protective cover mechanism 8 is preferably arranged or mounted on or in the tool change opening 131 formed in the carrier portion 13 of the machine frame 1, preferably in such a way that in the closed state the protective cover mechanism 8 closes the tool change opening 131 formed in the carrier portion 13 of the machine frame 1 towards the processing area, wherein the work spindle positioned at the tool change position is preferably arranged on the side of the closed cover mechanism 8 or a protective cover portion of the closed protective cover mechanism 8, said side facing away from the processing area, and the work spindle positioned at the processing position or work position is arranged on the side of the closed protective cover mechanism 8 or a protective cover portion of the closed protective cover mechanism 8, said side facing the processing area.

The first and second protective cover portions 81a and 81b are preferably configured to close the protective cover apparatus 8 by moving them along the tool change opening 131 upwards and/or downwards or alternatively folding them towards the processing area.

Figure 10A:
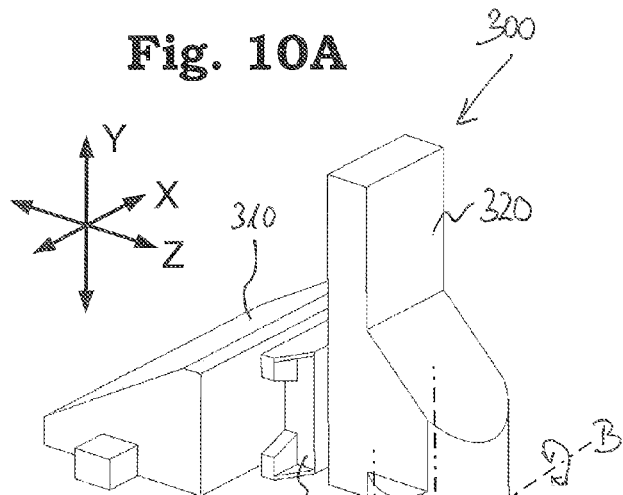
FIGS. 10A, 10B and 10C show, by way of example, perspective views of an axis slide assembly according to a further embodiment.
Figure 10B:
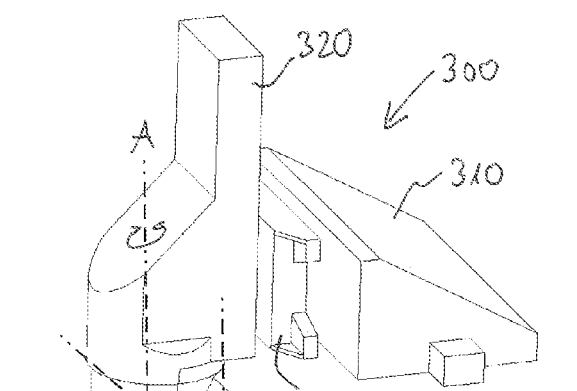
Figure 10C:
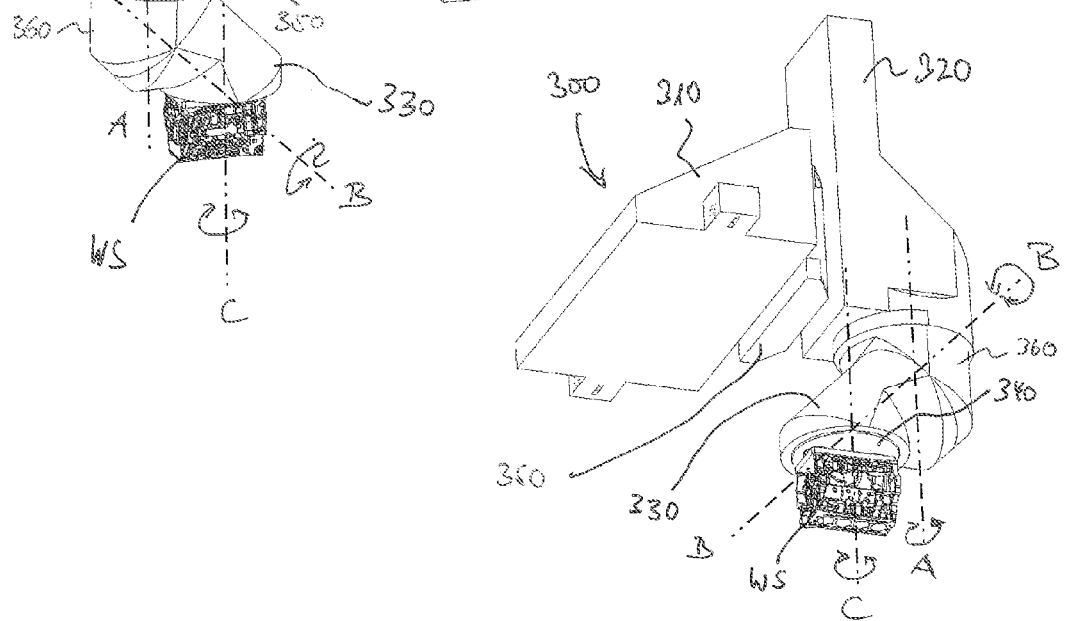

FIGS. 10A, 10B and 10C show exemplary perspective views of an axis slide assembly 30 according to a further embodiment. Such an axis slide assembly 300 can also be placed on the machine frame 1 according to FIG. 6A to 6C or 7A in order to provide a machine tool 100 of a further embodiment.

Other than the axis slide assembly 3 according to the above embodiments, an additional X-axis with an additional X-axis slide 350 (e.g., between the axis slides 310 and 320) and, e.g., an additional circular axis A with a swivel head 360 (e.g., between the axis slide 320 and the swivel head 330) are here provided on the axis slide assembly 300 in the embodiment according to FIGS. 10A to 10C.

The axis slide assembly 300 comprises, by way of example, a first axis slide 310 of the horizontal Z-axis (in analogy to the axis slide assembly 3), a second axis slide 350 of the horizontal X-axis and a third axis slide 320 of the vertical Y-axis (in analogy to the axis slide assembly 3) and also a swivel head 330 of the B-axis (in analogy to the axis slide assembly 3) and a rotary element 340 of the C-axis (in analogy to the axis slide assembly 3) as well as a further swivel head 360 of an A-axis with a vertical rotational axis A.

In particular, the first axis slide 310 (in analogy to the axis slide assembly 3) is movable in the horizontal Z-direction on the machine frame 1 of the machine tool 100, wherein the first axis slide 310 is provided as a base of the axis slide assembly 300 and a movement of the first axis slide 310 moves the entire axis slide assembly 300, so to speak as a unit.

The first axis slide 310 carries in particular the second axis slide 320 which can be moved on the first axis slide 310 horizontally in the X-direction, and the second axis slide 310 carries the third axis slide 320 which is movable on the second axis slide 310 vertically in the Y-direction (in analogy to the second axis slide 320 of the axis slide assembly 3) and the third axis slide 320 carries the pivotable swivel head 360 of the A-axis and the swivel head 360 carries the swivel head 330 of the B-axis, wherein the swivel head 330 again carries the turnable rotary element 340 of the C-axis (in analogy to the axis slide assembly 3). Insofar the Z-, X-, Y-, A-, B- and C-axes, e.g., build on one another.

The bottom side of the third axis slide 320 holds, e.g., a swivel head 360, which is mounted in turnable and/or pivotable fashion on the third axis slide 320 with a vertical rotational axis A of the A-axis. The drive or drives and possible gear transmissions and bearings of the swivel head 360 are not shown but can be arranged, e.g., in the interior of the second axis slide 320 and/or in the interior of the swivel head 360.

The bottom side of the swivel head 360 holds, e.g., the swivel head 330, which is mounted in rotational and/or pivotable fashion on the swivel head 360 by way of a rotational axis B of the B-axis which is inclined in relation to the rotation axis A or to the Y-direction of the Y-axis.

For example, the rotational axis B of the B-axis is inclined in analogy to the axis slide assembly 3 at an angle of 45 degrees in relation to the plane of the X-direction and Z-direction and, e.g., in the plane of the X-direction and Z-direction. The drive or drives and possible gear transmissions and bearings of the swivel head 330 are not shown, but can be arranged, e.g., in the interior of the swivel head 330 and/or in the interior of the swivel head 360.

It should here be noted that in this embodiment the rotational axis B of the B-axis (pivot axis) also pivots when the swivel head 360 is pivoted and thus is not fixed in the space but rather orients itself in accordance with the angular position of the swivel head 360. This swivel head 360 can be used to keep the workpiece WS either aligned with the spindles (with a rotational axis B aligned with the spindles) or to pivot it towards the conveyor device 7 (with a rotational axis B aligned with the conveyor device 7), e.g., for a workpiece change.

The bottom side of the swivel head 330 holds, e.g., a rotary element 340 of the rotary axis (C-axis) (in analogy to the axis slide assembly 3), which is rotatably or pivotably mounted on the swivel head 330, with a rotational axis of the C-axis which is aligned or can be aligned parallel to the vertical Y-axis.

It should here be noted that in this embodiment the rotational axis C of the C-axis (rotary axis) also pivots when the swivel head 330 is pivoted and is thus not fixed in space but rather orients itself in accordance with the angular position of the swivel head 330.

The drive or drives and possible gear transmissions and bearings of the rotary element 340 are not shown in FIGS. 5A and 5B but can be arranged, e.g., in the interior of the swivel head 330.

For example, a workpiece clamping device 2 (e.g., with a workpiece pallet holder) is arranged on the bottom side of the rotary element 340. The workpiece clamping device 2 is, e.g., configured, in order to clamp a workpiece WS, to clamp a workpiece pallet on the workpiece pallet holder of the workpiece clamping device 2, e.g., by an automatic gripping mechanism and/or also by electromagnetic or inductive clamping mechanisms.

Here, the machine tool 100 is configured by way of an axis slide assembly 3 of the embodiment according to FIGS. 10A to 10C to process workpieces WS by way of overhead processing on the machine tool 100, e.g., by clamping a workpiece WS attached to a workpiece pallet for the overhead processing in suspended fashion (or overhead suspended fashion) on the machine tool with upwardly facing workpiece pallet on the workpiece pallet holder of the workpiece clamping device 2.

In the above described embodiments of the present disclosure, the machine tool 100 is made as a double spindle milling machine having two work spindles 41 and 42. However, the present disclosure is by no means limited to such a double spindle system. It is possible to provide more than two spindles preferably on top of one another in further embodiments.

A further advantage can readily be provided when the spindles 41 and 42 are formed with spindle cartridges introduced from the rear side into the spindle housings 411 and 421, which can be exchanged with other spindle cartridges for the purpose of maintenance work or modification or upgrades.

Examples and/or embodiments of the present disclosure and advantages thereof are specified above with reference to the enclosed drawings. It is again pointed out that the present disclosure is by no means limited or confined to the above described embodiments and the design features thereof but also comprises modifications of the embodiments, in particular those comprised by modifications of the features of the described examples and/or by combination of individual or several of the features of the described examples on the basis of the scope of the independent claims.

In summary, a machine tool concept is proposed by way of which it is advantageously possible to create in an advantageous, exceptional and novel way an efficient machine tool which runs with high precision, is cost-effective, extremely compact and has optimally minimized down times, in particular since in each case at least one (or more) of the spindles can process a workpiece at a respective work position while a tool change can be carried out at a respective tool change position at least at another spindle (or at several other spindles) without interrupting the processing of the workpiece or workpieces for the tool change.

| List of reference signs | |
|---|---|
| 100 | machine tool |
| 1 | machine frame |
| 11 | first carrier portion |
| 12 | second carrier portion |
| 121 | chip discharge opening |
| 13 | third carrier portion |
| 131 | tool change opening |
| 14 | fourth carrier portion |
| 141 | workpiece change opening |
| 2 | workpiece clamping device |
| 3 (300) | axis slide assembly |
| 310 | first axis slide (Z-axis) |
| 311 | first axis guides (Z-axis) |
| 312 | first axis guide elements (Z-axis) |
| 313 | first threaded shaft (Z-axis) |
| 314 | first axis drive (Z-axis) |
| 320 | second axis slide (Y-axis) |
| 321 | second axis guides (Y-axis) |
| 322 | second axis guide elements (Y-axis) |
| 323 | second threaded shaft (Y-axis) |
| 324 | second axis drive (Y-axis) |
| 330 | swivel head (B-axis) |
| B | rotational axis of the B-axis |
| 340 | rotary element (C-axis) |
| C | rotational axis of the C-axis |
| 4 | spindle assembly |
| 41 | first work spindle |
| 411 | first spindle housing |
| 412 | first spindle carrier slide (X1-axis) |
| 413 | first spindle carrier drive (X1-axis) |
| 414 | first spindle carrier guides (X1-axis) |
| 415 | first spindle carrier threaded shaft |
| 416 | first spindle carrier guide elements |
| 42 | second work spindle |
| 421 | second spindle housing |
| 422 | second spindle carrier slide (X2-axis) |
| 423 | second spindle carrier drive (X2-axis) |
| 424 | second spindle carrier guides (X2-axis) |
| 425 | second spindle carrier threaded shaft |
| 426 | second spindle carrier guide elements |
| 6 | chip collecting pan |
| 7 | conveyor device |
| 71 | input conveying portion |
| 72 | output conveying portion |
| 73 | conveying device carrier slide |
| 74 | carrier slide guides |
| 75 | carrier slide guiding elements |
| 76 | conveying device drive |
| 77 | conveying drive threaded shaft |
| 8 | protective cover apparatus |
| 81a | first protective cover portion |
| 81b | second protective cover portion |
| 10 | tool magazine |
| 101 | tool magazine carrier |

List of reference signs

| | |
|---|---|
| 101a | first change portion |
| 101b | second change portion |
| 101c | holding portion |
| 102 | tool magazine chain |
| 103 | magazine chain drive |
| 104 | magazine chain drive gear |
| 105 | magazine guides (Z2-axis) |
| 106 | magazine guiding elements (Z2-axis) |
| 107 | magazine threaded shaft (Z2-axis) |
| 108 | magazine carrier drive (Z2-axis) |
| WZH | tool holder |
| WZ | tool |
| WS | workpiece |

Changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A machine tool, comprising:
   a machine frame;
   a workpiece clamping device for clamping a workpiece;
   an axis slide assembly arranged on the machine frame and configured to linearly move the workpiece clamped on the workpiece clamping device by way of at least two controllable linear axes; and
   a spindle carrier assembly arranged on the machine frame and having at least two tool-carrying work spindles;
   wherein a first work spindle of the at least two tool-carrying work spindles is moveable linearly by way of a third controllable linear axis perpendicularly to the respective two controllable linear axes of the axis slide assembly between a first processing position of the first work spindle and a first tool change position of the first work spindle, and
   wherein a second work spindle of the at least two tool-carrying work spindles is moveable linearly by way of a fourth controllable linear axis parallel to the direction of the third controllable linear axis between a second processing position of the second work spindle and a second tool change position of the second work spindle,
   the machine tool further comprising a tool magazine that has a tool magazine carrier arranged on the machine frame and configured to have available a plurality of tools and that by way of the fifth linear axis is moveable perpendicularly to the directions of the third and fourth linear axes and in particular parallel to the spindle axes of the two tool-carrying work spindles.

2. The machine tool according to claim 1, wherein the directions of the third and fourth linear axes are aligned horizontally and the first tool change position is substantially arranged above the second tool change position.

3. The machine tool according to claim 1, wherein the tool change positions of the two tool-carrying work spindles are arranged in a first position of the tool magazine carrier on respective change portions of the tool magazine carrier, and in the first position of the tool magazine carrier, the two tool-carrying work spindles are configured, by a respective movement of the respective tool change position, to directly insert, for a tool change, tools into a tool holder of the tool magazine at the respective change portion of the tool magazine carrier.

4. The machine tool according to claim 3, wherein the tool magazine carrier is configured to move from the first position into a second position by way of the fifth linear axis in order to remove a tool received at one of the tool spindles at the respective tool change position.

5. The machine tool according to claim 3, wherein the tool magazine carrier is configured to move from the second position into the first position by way of the fifth linear axis in order to insert a tool on one of the tool spindles at the respective tool change position.

6. The machine tool according to claim 1, wherein the tool magazine also has a tool magazine chain arranged on the tool magazine carrier in such a way that the tool magazine chain is moveable circumferentially.

7. The machine tool according to claim 1, wherein a respective work spindle positioned at the corresponding processing position is configured by way of a received tool to process the workpiece clamped on the workpiece clamping device while the respective other work spindle is positioned for a tool change at the respective tool change position.

8. The machine tool according to claim 1, wherein after the tool change, a respective work spindle positioned at the corresponding tool change position is configured to accelerate to processing spindle speeds while the respective other work spindle processes the workpiece clamped on the workpiece clamping device by way of a received tool.

9. A machine tool, comprising:
   a machine frame;
   a workpiece clamping device for clamping a workpiece;
   an axis slide assembly arranged on the machine frame and configured to linearly move the workpiece clamped on the workpiece clamping device by way of at least two controllable linear axes; and
   a spindle carrier assembly arranged on the machine frame and having at least two tool-carrying work spindles;
   wherein a first work spindle of the at least two tool-carrying work spindles is moveable linearly by way of a third controllable linear axis perpendicularly to the respective two controllable linear axes of the axis slide assembly between a first processing position of the first work spindle and a first tool change position of the first work spindle, and
   wherein a second work spindle of the at least two tool-carrying work spindles is moveable linearly by way of a fourth controllable linear axis parallel to the direction of the third controllable linear axis between a second processing position of the second work spindle and a second tool change position of the second work spindle,
   the machine tool further comprising a protective cover device that is automatically openable to an open state and closable to a closed state, and which in the closed state separates a processing area of the machine tool that includes the workpiece clamping device from the tool change positions of the machine tool and in the open state renders possible a movement of the work spindles between the processing area and the respective tool change positions.

10. The machine tool according to claim 1, wherein the first work spindle and the second work spindle are both configured to receive tool interfaces of equal size.

11. The machine tool according to claim 1, wherein the first work spindle and the second work spindle are both configured to receive tool interfaces of an equal tool interface type, in particular of the hollow shaft cone type, Morse taper type or steep taper type.

12. The machine tool according to claim 1, wherein the machine frame forms a processing area and the axis slide assembly is arranged above the processing area on the machine frame, and wherein the workpiece clamping device is held on the axis slide assembly and is configured to clamp the workpiece or a workpiece pallet holding the workpiece in suspended or laterally suspended fashion, in particular for the overhead processing of the workpiece clamped in suspended fashion on the workpiece clamping device.

13. A machine tool, comprising:
a machine frame;
a workpiece clamping device for clamping a workpiece;
an axis slide assembly arranged on the machine frame and configured to linearly move the workpiece clamped on the workpiece clamping device by way of at least two controllable linear axes; and
a spindle carrier assembly arranged on the machine frame and having at least two tool-carrying work spindles;
wherein a first work spindle of the at least two tool-carrying work spindles is moveable linearly by way of a third controllable linear axis perpendicularly to the respective two controllable linear axes of the axis slide assembly between a first processing position of the first work spindle and a first tool change position of the first work spindle,
wherein a second work spindle of the at least two tool-carrying work spindles is moveable linearly by way of a fourth controllable linear axis parallel to the direction of the third controllable linear axis between a second processing position of the second work spindle and a second tool change position of the second work spindle, and
wherein the machine frame forms a processing area and the axis slide assembly is arranged above the processing area on the machine frame, and wherein the workpiece clamping device is held on the axis slide assembly and is configured to clamp the workpiece or a workpiece pallet holding the workpiece in suspended or laterally suspended fashion, in particular for the overhead processing of the workpiece clamped in suspended fashion on the workpiece clamping device,
the machine tool further comprising a conveying device for conveying workpieces, in particular with an upwardly or laterally aligned workpiece pallet, to a clamping position in order to be received by the workpiece clamping device from above for the suspended or laterally suspended clamping of one of the workpieces on the workpiece clamping device and for conveying one of the workpieces, in particular with upwardly or laterally aligned workpiece pallet, from an unclamping position after releasing the workpiece from the suspended or laterally suspending clamping by the workpiece clamping device.

14. A machine tool, comprising:
a machine frame,
a workpiece clamping device for clamping a workpiece,
an axis slide assembly arranged on the machine frame and configured to linearly move the workpiece clamped on the workpiece clamping device by way of at least two controllable linear axes; and
a spindle carrier assembly arranged on the machine frame and having at least two tool-carrying work spindles,
wherein a first work spindle of the at least two tool-carrying work spindles is moveable linearly by way of a third controllable linear axis perpendicularly to the respective two controllable linear axes of the axis slide assembly between a first processing position of the first work spindle and a first tool change position of the first work spindle,
wherein a second work spindle of the at least two tool-carrying work spindles is moveable linearly by way of a fourth controllable linear axis parallel to the direction of the third controllable linear axis between a second processing position of the second work spindle and a second tool change position of the second work spindle, and
wherein:
the axis slide assembly is further configured to rotatorily move the workpiece clamped on the workpiece clamping device by way of a controllable circular axis.

15. The machine tool according to claim 1, wherein the axis slide assembly is configured to linearly move the workpiece clamped on the workpiece clamping device by way of a at least three controllable linear axes.

16. The machine tool according to claim 1, wherein the respective work spindle positioned at the processing position by way of a received tool is configured to process the workpiece clamped on the workpiece clamping device.

17. The machine tool according to claim 1, wherein:
the workpiece clamping device is configured for overhead clamping of the workpiece;
the at least two controllable linear axes include a vertically movable, controllable first linear axis and a horizontally movable, controllable second linear axis;
the axis slide assembly is configured to move in vertically linear fashion the workpiece clamped in overhead fashion on the workpiece clamping device by way of the first linear axis in a Y-direction and to move the workpiece in horizontally linear fashion by way of the second linear axis in a Z-direction; and
the at least two tool-carrying work spindles that are moveable independently of each other in horizontally linear fashion and parallel in an X-direction aligned perpendicularly in relation to the Z-direction.

18. The machine tool of claim 14, wherein the axis slide assembly is further configured to rotatorily move the workpiece clamped on the workpiece clamping device by way of two controllable circular axes about respective rotational axes, which are inclined or perpendicular to one another.

19. The machine tool of claim 14, wherein the axis slide assembly is configured to rotatorily move the workpiece clamped on the workpiece clamping device by way of three controllable circular axes about respective rotational axes, at least one rotational axis of which is inclined or perpendicular with respect to at least one of the other rotational axes.

20. The machine tool according to claim 1, wherein the first work spindle is configured to receive tool interfaces of a first size and the second work spindle is configured to receive tool interfaces of a second size which differs from the first size.

21. The machine tool according to claim 1, wherein the first work spindle is configured to receive tool interfaces of a first tool interface type, in particular of the hollow shaft cone type, Morse taper type or steep taper type, and the second work spindle is configured to receive tool interfaces of a second tool interface type that differs from the first tool interface type.

* * * * *